(12) United States Patent
Miles

(10) Patent No.: US 8,054,532 B2
(45) Date of Patent: Nov. 8, 2011

(54) METHOD AND DEVICE FOR PROVIDING ILLUMINATION TO INTERFEROMETRIC MODULATORS

(75) Inventor: Mark W. Miles, Atlanta, GA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/815,136

(22) Filed: Jun. 14, 2010

(65) Prior Publication Data

US 2010/0309540 A1 Dec. 9, 2010

Related U.S. Application Data

(60) Continuation of application No. 11/742,271, filed on Apr. 30, 2007, which is a division of application No. 11/192,436, filed on Jul. 28, 2005, now Pat. No. 7,463,421, which is a continuation of application No. 11/056,571, filed on Feb. 11, 2005, now Pat. No. 7,379,227, which is a continuation of application No. 09/966,843, filed on Sep. 28, 2001, now Pat. No. 6,867,896, which is a division of application No. 09/056,975, filed on Apr. 8, 1998, now Pat. No. 6,674,562, which is a continuation-in-part of application No. 08/769,947, filed on Dec. 19, 1996, now abandoned, and a continuation-in-part of application No. 08/554,630, filed on Nov. 6, 1995, now abandoned, and a continuation-in-part of application No. 08/238,750, filed on May 5, 1994, now Pat. No. 5,835,255.

(51) Int. Cl.
*G02B 26/006* (2006.01)

(52) U.S. Cl. ......................... 359/291; 359/290

(58) Field of Classification Search ............. 359/290, 359/291, 223, 224, 238, 248
See application file for complete search history.

(56) References Cited

U.S. PATENT DOCUMENTS

| | | | |
|---|---|---|---|
| 3,886,310 | A | 5/1975 | Guldberg |
| 4,421,381 | A | 12/1983 | Ueda |
| 4,441,791 | A | 4/1984 | Hornbeck |

(Continued)

FOREIGN PATENT DOCUMENTS

DE 196 22 748 12/1997

(Continued)

OTHER PUBLICATIONS

Austrian Search Report for U.S. Appl. No. 11/057392 dated May 12, 2005.

(Continued)

*Primary Examiner* — Ricky Mack
*Assistant Examiner* — Vipin Patel
(74) *Attorney, Agent, or Firm* — Knobbe Martens Olson & Bear LLP

(57) ABSTRACT

An Interferometric Modulator (IMod) is a microelectromechanical device for modulating light using interference. The colors of these devices may be determined in a spatial fashion, and their inherent color shift may be compensated for using several optical compensation mechanisms. Brightness, addressing, and driving of IMods may be accomplished in a variety of ways with appropriate packaging, and peripheral electronics which can be attached and/or fabricated using one of many techniques. The devices may be used in both embedded and directly perceived applications, the latter providing multiple viewing modes as well as a multitude of product concepts ranging in size from microscopic to architectural in scope.

21 Claims, 26 Drawing Sheets

U.S. PATENT DOCUMENTS

| | | | |
|---|---|---|---|
| 5,142,414 | A | 8/1992 | Koehler |
| 5,291,314 | A | 3/1994 | Agranat |
| 5,500,761 | A * | 3/1996 | Goossen et al. ............. 359/290 |
| 5,550,373 | A | 8/1996 | Cole |
| 5,579,149 | A | 11/1996 | Moret |
| 5,671,994 | A | 9/1997 | Tai |
| 5,712,694 | A | 1/1998 | Taira et al. |
| 5,805,117 | A | 9/1998 | Mazurek |
| 5,914,804 | A | 6/1999 | Goossen |
| 5,920,417 | A | 7/1999 | Johnson |
| 5,933,183 | A | 8/1999 | Enomoto |
| 5,991,073 | A | 11/1999 | Woodgate et al. |
| 6,040,937 | A | 3/2000 | Miles |
| 6,049,317 | A | 4/2000 | Thompson et al. |
| 6,151,089 | A | 11/2000 | Yang et al. |
| 6,195,196 | B1 | 2/2001 | Kimura |
| 6,381,022 | B1 | 4/2002 | Zavracky |
| 6,574,033 | B1 | 6/2003 | Chui |
| 6,597,490 | B2 | 7/2003 | Tayebati |
| 6,650,455 | B2 | 11/2003 | Miles |
| 6,674,562 | B1 | 1/2004 | Miles |
| 6,680,792 | B2 | 1/2004 | Miles |
| 6,741,377 | B2 | 5/2004 | Miles |
| 6,794,119 | B2 | 9/2004 | Miles |
| 6,879,354 | B1 | 4/2005 | Sawayama |
| 6,882,461 | B1 | 4/2005 | Tsai |
| 7,009,754 | B2 | 3/2006 | Huibers |
| 7,042,643 | B2 | 5/2006 | Miles |
| 7,110,158 | B2 | 9/2006 | Miles |
| 7,123,216 | B1 | 10/2006 | Miles |
| 7,138,984 | B1 | 11/2006 | Miles |
| 7,161,730 | B2 | 1/2007 | Floyd |
| 7,187,489 | B2 | 3/2007 | Miles |
| 7,342,705 | B2 | 3/2008 | Chui et al. |
| 7,342,709 | B2 | 3/2008 | Lin |
| 7,349,139 | B2 | 3/2008 | Chui |
| 7,349,141 | B2 | 3/2008 | Tung |
| 7,355,780 | B2 | 4/2008 | Chui |
| 7,603,001 | B2 | 10/2009 | Wang |
| 7,719,747 | B2 | 5/2010 | Tung |
| 7,750,886 | B2 | 7/2010 | Sampsell |
| 7,880,954 | B2 | 2/2011 | Sampsell |
| 2001/0019479 | A1 | 9/2001 | Nakabayashi |
| 2001/0049061 | A1 | 12/2001 | Nakagaki |
| 2001/0055208 | A1 | 12/2001 | Kimura |
| 2002/0075555 | A1 | 6/2002 | Miles |
| 2004/0051929 | A1 | 3/2004 | Sampsell |
| 2005/0002082 | A1 | 1/2005 | Miles |
| 2005/0259302 | A9 | 11/2005 | Metz et al. |
| 2005/0286113 | A1 | 12/2005 | Miles |
| 2006/0001942 | A1 | 1/2006 | Chui |
| 2006/0066935 | A1 | 3/2006 | Cummings |
| 2006/0067651 | A1 | 3/2006 | Chui |
| 2006/0132383 | A1 | 6/2006 | Gally |
| 2008/0112039 | A1 | 5/2008 | Chui |
| 2008/0151347 | A1 | 6/2008 | Chui |
| 2009/0168459 | A1 | 7/2009 | Holman |
| 2009/0225394 | A1 | 9/2009 | Chui |
| 2009/0310208 | A1 | 12/2009 | Wang |
| 2009/0323153 | A1 | 12/2009 | Sampsell |

FOREIGN PATENT DOCUMENTS

| | | |
|---|---|---|
| EP | 0 590 511 | 4/1994 |
| EP | 0 822 441 | 2/1998 |
| EP | 0 867 747 A2 | 9/1998 |
| EP | 0 879 991 | 11/1998 |
| EP | 1 640 776 | 3/2006 |
| EP | 2 251 731 | 11/2010 |
| EP | 2 261 720 | 12/2010 |
| GB | 2 278 222 | 11/1994 |
| JP | 10 325953 | 12/1998 |
| JP | 11 174234 | 7/1999 |
| JP | 11 211999 | 8/1999 |
| JP | 11 249132 | 9/1999 |
| JP | 2000 514568 | 10/2000 |
| JP | 2004-206049 | 7/2004 |
| WO | WO 97/46908 | 12/1997 |
| WO | WO 2004/006003 | 1/2004 |

OTHER PUBLICATIONS

Extended Search Report in European Application No. 10176513.9, dated Oct. 22, 2010.
Extended European Search Report in App. No. 05255703.0 (Publication No. EP 1640776) dated Jan. 19, 2006.
Extended European Search Report in App. No. 101709764.4 dated Oct. 7, 2010.
Office Action in U.S. Appl. No. 11/417,808, dated Jun. 14, 2006.
Amendment in U.S. Appl. No. 11/417,808, dated Sep. 14, 2006.
Final Office Action in U.S. Appl. No. 11/417,808, dated Nov. 27, 2006.
Request for Continued Examination and Amendment in U.S. Appl. No. 11/417,808, dated Feb. 26, 2007.
Office Action in U.S. Appl. No. 11/417,808, dated Jun. 29, 2007.
Amendment in U.S. Appl. No. 11/417,808, dated Oct. 1, 2007.
Office Action in U.S. Appl. No. 11/417,808, dated Jan. 2, 2008.
Response to Office Action in U.S. Appl. No. 11/417,808, dated Apr. 2, 2008.
Office Action in U.S. Appl. No. 11/417,808, dated Jul. 14, 2008.
Response to Office Action in U.S. Appl. No. 11/417,808, dated Jan. 13, 2009.
Final Office Action in U.S. Appl. No. 11/417,808, dated Apr. 6, 2009.
Request for Continued Examination and Response to Office Action in U.S. Appl. No. 11/417,808, dated Aug. 6, 2009.
Office Action in U.S. Appl. No. 11/417,808, dated Oct. 30, 2009.
Response to Office Action in U.S. Appl. No. 11/417,808, dated Feb. 1, 2010.
Notice of Allowance in U.S. Appl. No. 11/417,808, dated May 19, 2010.
Request for Continued Examination and Information Disclosure Statement in U.S. Appl. No. 11/417,808, dated Aug. 18, 2010.
Notice of Allowance in U.S. Appl. No. 11/417,808, dated Sep. 20, 2010.
Office Action in U.S. Appl. No. 13/015,432, dated Mar. 18, 2011.
Official Communication for European Application No. 05724222.4 dated Jun. 19, 2007.
Office Action in European Application No. 05 724 222.4 dated Jul. 8, 2008.
Office Action in European Application No. 05724222.4 dated Sep. 28, 2009.
Office Action in Japanese Application No. 2007-501906 dated Jul. 21, 2009.
Office Action in Japanese Application No. 2007-501906 dated Oct. 12, 2010.
Office Action in Mexican Application No. PA/a/2006/010063 dated Jan. 20, 2009.
Office Action in Mexican Application No. PA/a/2006/010063 dated Jul. 30, 2009.
Office Action in Russian Application No. 2006135114/28(038223) date stamped Mar. 31, 2009.
Office Action in Taiwanese Application No. 094106671 dated Oct. 30, 2006.
Office Action in Taiwanese Application No. 094106671 dated Apr. 26, 2010.
Final Office Action in Taiwanese Application No. 094106671 dated Nov. 18, 2010.
Office Action in Vietnamese Application No. Jan. 2006-01629 dated Apr. 29, 2009.
Notice of Allowance in U.S. Appl. No. 11/057,392 dated Apr. 6, 2006.
Request for Continued Examination in U.S. Appl. No. 11/057,392 dated Jul. 5, 2006.
Notice of Allowance in U.S. Appl. No. 11/057,392 dated Aug. 10, 2006.
Request for Continued Examination in U.S. Application No. 11/057,392 dated Nov. 13, 2006.
Notice of Allowance in U.S. Appl. No. 11/057,392 dated Jun. 6, 2007.
Request for Continued Examination in U.S. Appl. No. 11/057,392 dated Sep. 5, 2007.

Notice of Allowance in U.S. Appl. No. 11/057,392 dated Sep. 25, 2007.
Applicant Summary of Interview in U.S. Appl. No. 11/057,392 dated Dec. 21, 2007.
Office Action in U.S. Appl. No. 11/417,431, dated Jun. 18, 2007.
Amendment in U.S. Appl. No. 11/417,431, dated Sep. 17, 2007.
Notice of Allowance in U.S. Appl. No. 11/417,431, dated Oct. 23, 2007.
Notice of Allowance in U.S. Appl. No. 12/036,668 dated on Sep. 23, 2009.
Request For Continued Examination and Information Disclosure Statement in U.S. Appl. No. 12/036,668 dated Nov. 13, 2009.
Notice of Allowance in U.S. Appl. No. 12/036,668 dated on Nov. 19, 2009.
Request For Continued Examination and Information Disclosure Statement in U.S. Appl. No. 12/036,668 dated Feb. 18, 2010.
Preliminary Amendment in U.S. Appl. No. 12/036,668 dated Feb. 25, 2010.
Notice of Allowance in U.S. Appl. No. 12/036,668 dated on Apr. 8, 2010.
Request for Continued Examination, Amendment, and Information Disclosure Statement in U.S. Appl. No. 12/036,668 dated Jul. 7, 2010.
Notice of Allowance in U.S. Appl. No. 12/036,668 dated on Jul. 21, 2010.
Request for Continued Examination and Information Disclosure Statement in U.S. Appl. No. 12/036,668 dated Oct. 20, 2010.
Preliminary Amendment in U.S. Appl. No. 12/036,668 dated Oct. 25, 2010.
Notice of Allowance in U.S. Patent Appl. No. 12/036,668, dated Nov. 1, 2010.
Supplemental Notice of Allowance in U.S. Appl. No. 12/036,668, dated Jan. 20, 2011.
Request for Continued Examination, Amendment, and Information Disclosure Statement in U.S. Appl. No. 12/036,668, dated Feb. 1, 2011.
Notice of Allowance in U.S. Appl. No. 12/036,668, dated Mar. 4, 2011.
Application as Filed in U.S. Appl. No. 13/018,221, dated Jan. 31, 2011.
Office Action in Chinese Application No. 2005101028024, dated May 9, 2008.
Office Action in Chinese Application No. 2005101028024, dated Mar. 13, 2009.
Decision of Rejection in Chinese Application No. 2005101028024, dated Sep. 4, 2009.
Official Communication in European Application No. 05255703.0, dated Oct. 17, 2007.
Official Communication in European Application No. 05255703.0, dated Mar. 9, 2010.
Official Communication in Japanese Application No. 2005-218736, dated Jul. 22, 2008.
Official Communication in Japanese Patent Application No. 2005-218736 dated Mar. 16, 2010.
Office Action in Mexican Application No. Pa/a/2005/010233, dated Oct. 30, 2007.
Office Action in Mexican Application No. PA/a/2005/010233, dated Jul. 7, 2008.

* cited by examiner

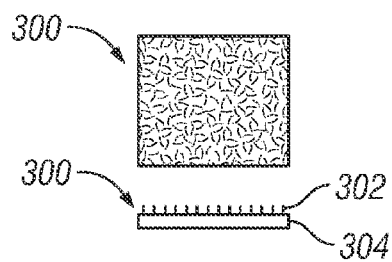
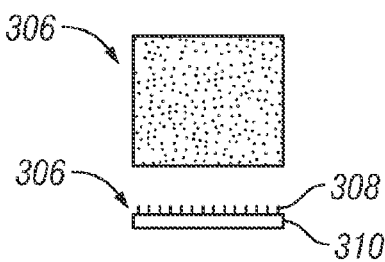
FIG. 3A    FIG. 3B
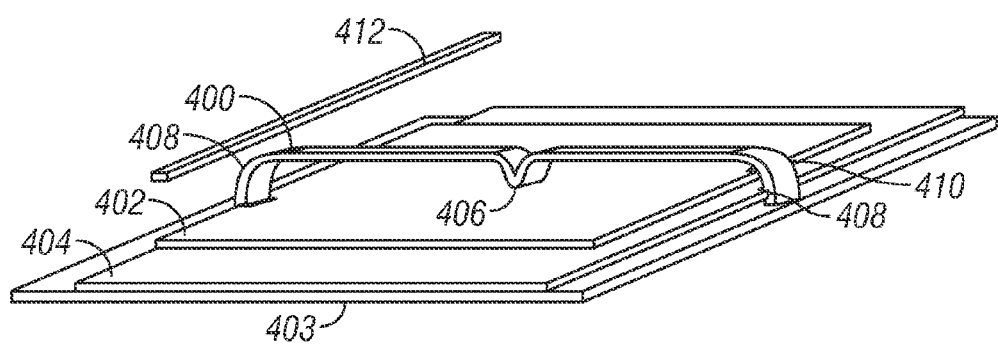
FIG. 4

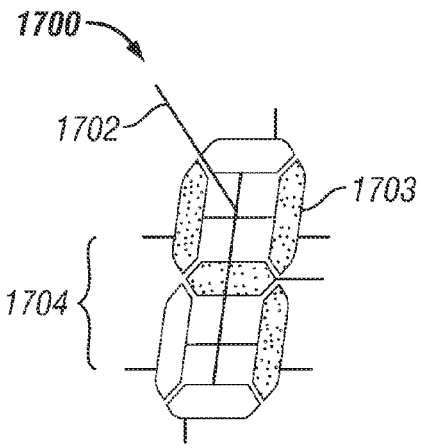
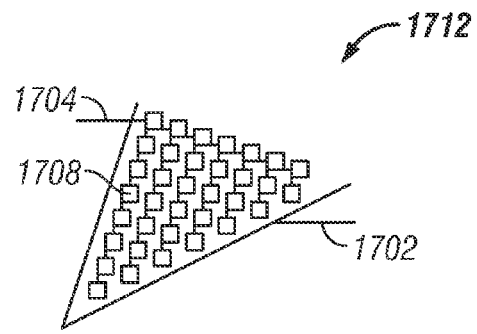
FIG. 17A  FIG. 17B
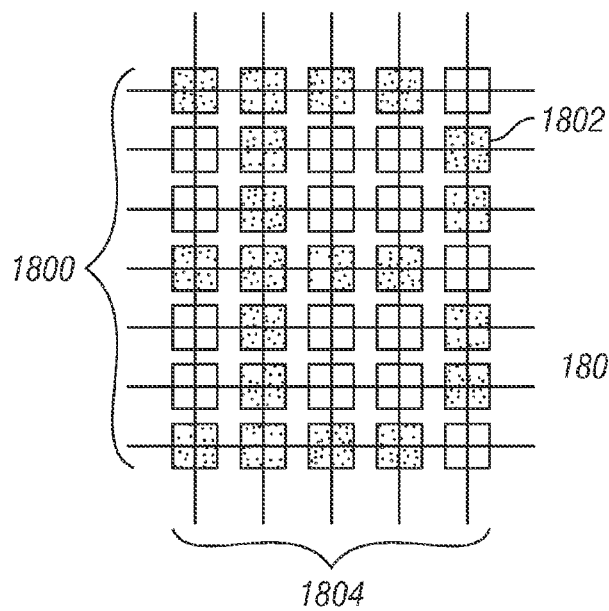
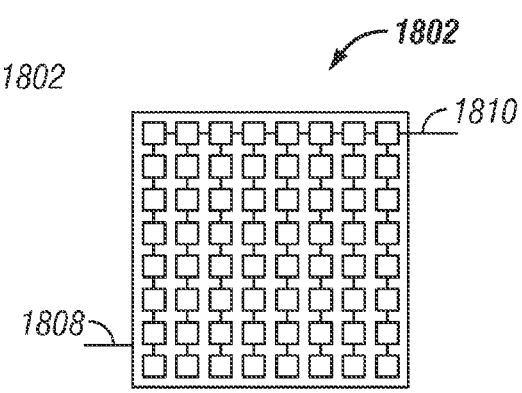
FIG. 18A  FIG. 18B

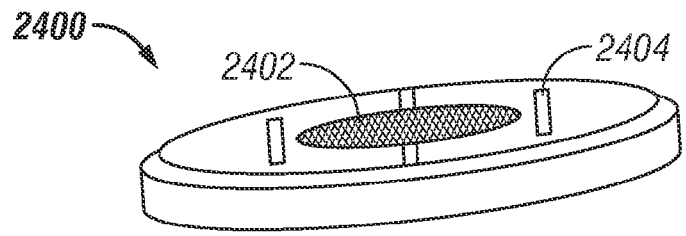
FIG. 24A
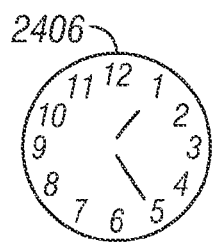
FIG. 24B
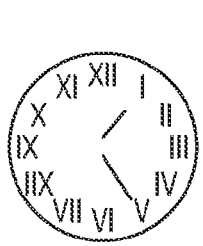
FIG. 24C
FIG. 24D
FIG. 24E
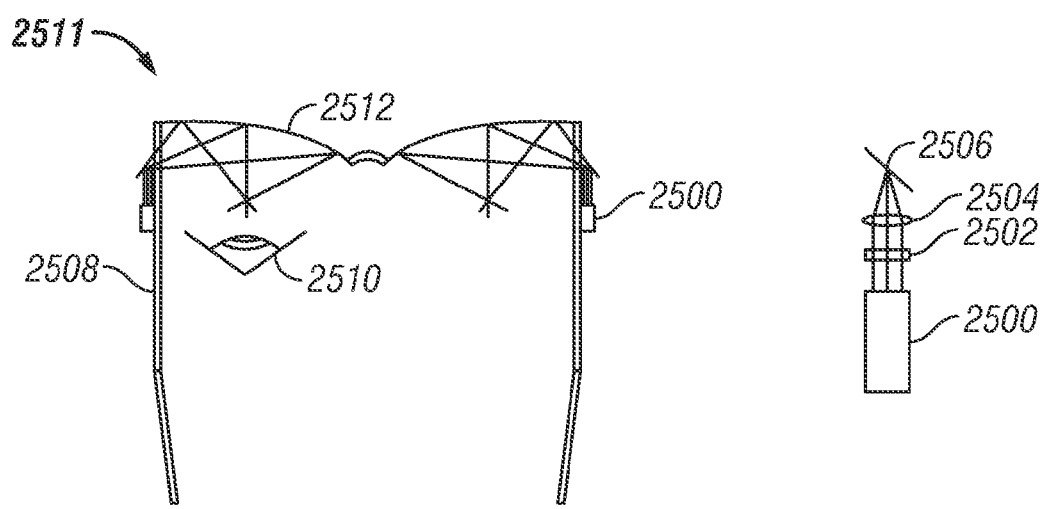
FIG. 25A  FIG. 25B

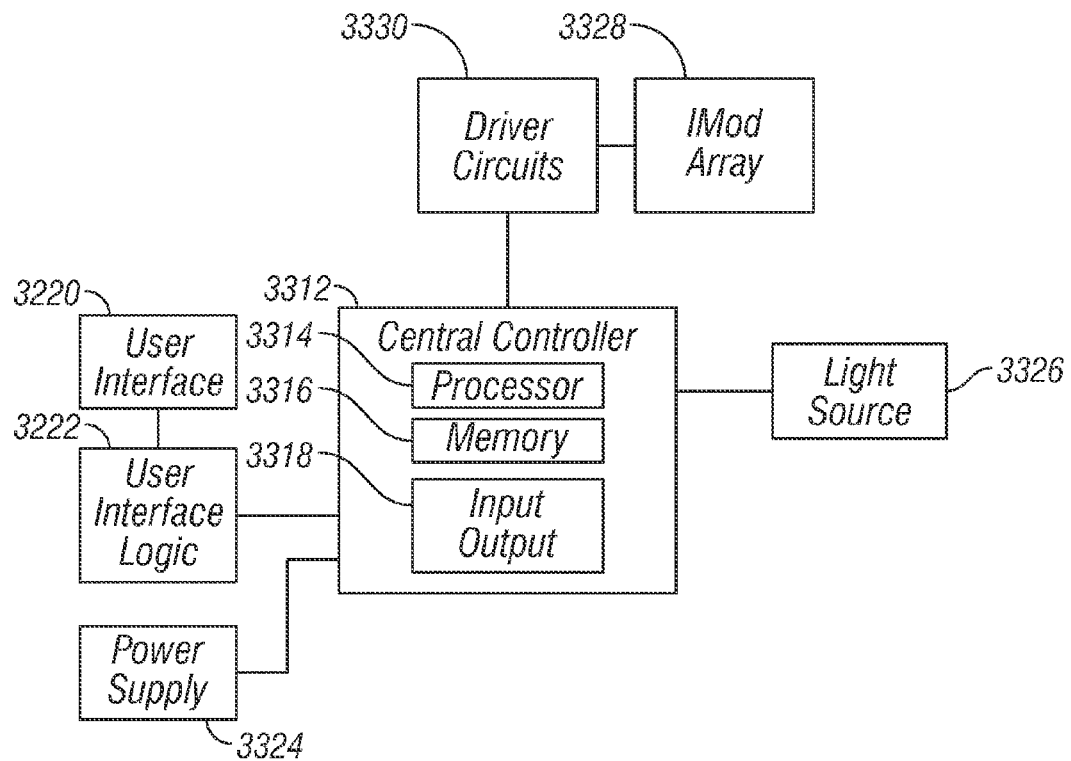
FIG. 33B
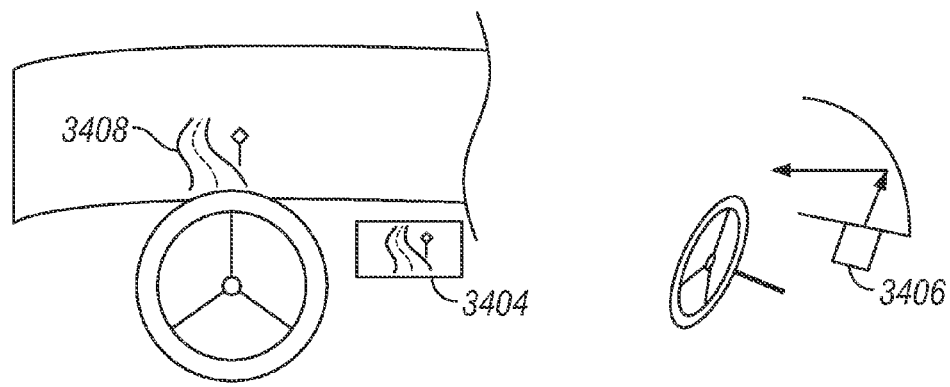
FIG. 34A
FIG. 34B

METHOD AND DEVICE FOR PROVIDING ILLUMINATION TO INTERFEROMETRIC MODULATORS

CROSS-REFERENCE TO RELATED APPLICATIONS

This application is a continuation of U.S. patent application Ser. No. 11/742,271, filed on Apr. 30, 2007 which is a division application of U.S. patent application Ser. No. 11/192,436, filed Jul. 28, 2005 (now U.S. Pat. No. 7,463,421), which is a continuation of U.S. patent application Ser. No. 11/056,571, filed Feb. 11, 2005 (now U.S. Pat. No. 7,379,227), which is a continuation of U.S. patent application Ser. No. 09/966,843, filed Sep. 28, 2001 (now U.S. Pat. No. 6,867,896), which is a divisional of U.S. patent application Ser. No. 09/056,975, filed Apr. 8, 1998 (now U.S. Pat. No. 6,674,562), which is a continuation-in-part of each of the following: (1) U.S. patent application Ser. No. 08/769,947, filed Dec. 19, 1996 (now abandoned), (2) U.S. patent application Ser. No. 08/554,630, filed Nov. 6, 1995 (now abandoned), and (3) U.S. patent application Ser. No. 08/238,750, filed May 5, 1994 (now U.S. Pat. No. 5,835,255). The disclosures of each of these prior applications are considered part of, and are incorporated by reference into, the disclosure of this application.

BACKGROUND OF THE INVENTION

Field of the Invention

This invention relates to visible spectrum (which we define to include portions of the ultra-violet and infrared spectra) modulator arrays and interferometric modulation.

The first patent application cited above describes two kinds of structures whose impedance, the reciprocal of admittance, can be actively modified so that they can modulate light. One scheme is a deformable cavity whose optical properties can be altered by deformation, electrostatically or otherwise, of one or both of the cavity walls. The composition and thickness of these walls, which comprise layers of dielectric, semiconductor, or metallic films, allows for a variety of modulator designs exhibiting different optical responses to applied voltages.

The second patent application cited above describes designs which rely on an induced absorber. These designs operate in reflective mode and can be fabricated simply and on a variety of substrates.

The devices disclosed in both of these patent applications are part of a broad class of devices which we will refer to as IMods (short for "interferometric modulators"). An IMod is a microfabricated device that modulates incident light by the manipulation of admittance via the modification of its interferometric characteristics.

Any object or image supporter which uses modulated light to convey information through vision is a form of visual media. The information being conveyed lies on a continuum. At one end of the continuum, the information is codified as in text or drawings, and at the other end of the continuum, it is abstract and in the form of symbolic patterns as in art or representations of reality (a picture).

Information conveyed by visual media may encompass knowledge, stimulate thought, or inspire feelings. But regardless of its function, it has historically been portrayed in a static form. That is, the information content represented is unchanging over time. Static techniques encompass an extremely wide range, but in general include some kind of mechanism for producing variations in color and/or brightness comprising the image, and a way to physically support the mechanism. Examples of the former include dyes, inks, paints, pigments, chalk, and photographic emulsion, while examples of the latter include paper, canvas, plastic, wood, and metal.

In recent history, static display techniques are being displaced by active schemes. A prime example is the cathode ray tube (CRT), but flat panel displays (FPD) offer promise of becoming dominant because of the need to display information in ever smaller and more portable formats.

An advanced form of the FPD is the active matrix liquid crystal display (AMLCD). AMLCDs tend to be expensive and large, and are heavy users of power. They also have a limited ability to convey visual information with the range of color, brightness, and contrast that the human eye is capable of perceiving, using reflected light, which is how real objects usually present themselves to a viewer. (Few naturally occurring things emit their own light.)

Butterflies, on the other hand, achieve a broad range of color, brightness, and contrast, using incident light, processed interferometrically, before delivery to the viewer.

SUMMARY OF THE INVENTION

In one embodiment of the present invention, a system for responding to a mode of use of a product is provided, the system comprising: a sensor configured to detect a change in the mode of use of a product; and a display device comprising an interferometric light modulator, wherein said display device is configured to display a selected image in response to a changing mode of use detected by said sensor.

In another embodiment, a system for responding to a mode of use of a product is provided, the system comprising: means for detecting a change in a mode of use of a product; and means for displaying a selected image in response to a changing mode of use detected by said means for detecting a change in a mode of use of a product.

In general, in one aspect, the invention features a modulator of light having an interference cavity for causing interference modulation of the light, the cavity having a mirror, the mirror having a corrugated surface.

In general, in another aspect of the invention, the interference modulation of the light produces a quiescent color visible to an observer, the quiescent color being determined by the spatial configuration of the modulator.

In implementations of the invention, the interference cavity may include a mirror and a supporting structure holding the mirror, and the spatial configuration may include a configuration of the supporting structure, or patterning of the mirror. The supporting structure may be coupled to a rear surface of the mirror. The invention eliminates the need for separately defined spacers and improves the fill-factor.

In general, in another aspect of the invention, the structure for modulating light includes modulators of light each including an interference cavity for causing interference modulation of the light, each of the modulators having a viewing cone. The viewing cones of the modulators are aligned in different directions.

In implementations of the invention, the viewing cones of the different modulators may be aligned in random directions and may be narrower than the viewing cone of the overall structure. Viewing a randomly oriented array of interference modulators effectively reduces the color shift.

In general, in another aspect of the invention, the modulators may be suspended in a solid or liquid medium.

In general, in another aspect of the invention, an optical compensation mechanism is coupled to the modulators to enhance the optical performance of the structure. In implementations of the invention, the mechanism may be a combination of one or more of a holographically patterned material, a photonic crystal array, a multilayer array of dielectric mirrors, or an array of microlenses. The brightness and/or color may be controlled by error diffusion. An array of modulators may be viewed through a film of material which, because of its tailored optical properties, enhances the view from a limited range of angles, or takes incident light of random orientation and orders it. The film may also enhance the fill factor of the pixel. The film may also comprise a patterned light emitting material to provide supplemental lighting.

In general, in another aspect of the invention, an optical fiber is coupled to the interference cavity. The invention may be used in the analysis of chemical, organic, or biological components.

In general, in another aspect of the invention, there is an array of interference modulators of light, a lens system, a media transport mechanism and control electronics.

In general, in another aspect, the invention features an information projection system having an array of interference modulators of light, a lens system, mechanical scanners, and control electronics. In implementations of the invention, the control electronics may be configured to generate projected images for virtual environments; and the array may include liquid crystals or micromechanical modulators.

In general, in another aspect, the invention features an electronics product having an operational element, a housing enclosing the operational element and including a display having a surface viewed by a user, and an array of interference modulators of light on the surface.

Implementations of the invention may include one or more of the following features. The operational element may include a personal communications device, or a personal information tool, or a vehicular control panel, or an instrument control panel, or a time keeping device. The array may substantially alter the aesthetic or decorative features of the surface. The aesthetic component may respond to a state of use of the consumer product. The array may also provide information. The modulation array of the housing may comprise liquid crystals, field emission, plasma, or organic emitter based technologies and associated electronics.

In general, in another aspect, the invention features devices in which aggregate arrays of interference modulators are assembled as a display, e.g., as a sign or a billboard.

In general, in another aspect, the invention features a vehicle having a body panel, an array of interference modulators of light on a surface of the body panel, and electronic circuitry for determining the aesthetic appearance of the body panel by controlling the array of interference modulators.

In general, in another aspect, the invention features a building comprising external surface elements, an array of interference modulators of light on a surface of the body panel, and electronic circuitry for determining the aesthetic appearance of the surface elements by controlling the array of interference modulators.

In general, in another aspect, the invention features a full color active display comprising a liquid crystal medium, and interferometric elements embedded in the medium.

In general, in another aspect, the invention features a structure including a substrate, micromechanical elements formed on the substrate, and electronics connected to control the elements, the electronics being formed also on the substrate.

Individual pixels of the array may consist of arrays of subpixels, allowing brightness and color control via the activation of some fraction of these subpixels in a process known as spatial dithering. Individual pixels or subpixel arrays may be turned on for a fraction of an arbitrary time interval to control brightness in a process known as pulse width modulation (PWM). Individual pixels or subpixel arrays may be turned on for a fraction of the time required to scan the entire array to control brightness in a process known as frame width modulation (FWM). These two schemes are facilitated by the inherent hysteresis of the IMod which allows for the use of digital driver circuits. Neighboring pixels yield a brightness value which is the average of the desired value when error diffusion is used. Brightness control may be achieved via a combination of spatial dithering, PWM/FWM, or error diffusion. Color control may be achieved by tuning individual colors to a particular color, or by combining pixels of different colors and different brightness. The terms pixels and IMods are interchangeable, but in general, pixel refers to a controllable element which may consist of one or more IMods or subpixels, and which is "seen" directly or indirectly by an individual.

The arrays may fabricated on a solid substrate of some kind which may be of any material as long as it provides a surface, portions of which are optically smooth. The material may be transparent or opaque. The material may be flat or have a contoured surface, or be the surface of a three dimensional object. The arrays may be fabricated on the surface, or on the opposite or both sides if the substrate is transparent. In a further aspect the invention can be viewed in a variety of ways.

Implementations of the invention may include one or more of the following features. The array may be directly viewed in that an individual can look at the array and see the represented information from any angle. The array may be directly viewed from a fixed angle. The array may be indirectly viewed in that the information is projected on to a secondary surface, or projected through an optical system, or both.

In yet another aspect the invention can be electrically controlled and driven in several ways.

Implementations of the invention may include one or more of the following features. The array may be fabricated on a substrate and the driver and controller electronics are fabricated on a separate substrate. The two substrates may be connected electrically or optically via cables, or optically, magnetically, or via radio frequencies via a free space connection. The array may be fabricated with driver, controller, or memory electronics, or some combination thereof, mounted on the same substrate and connected via conducting lines. The array may be fabricated on a substrate along with the driver, controller or memory electronics, or some combination thereof. The substrate may include active electronics which constitute driver, controller, or memory electronics, or some combination thereof, and the array may be fabricated on the substrate. The electronics may be implemented using microelectromechanical (MEM) devices.

In an additional aspect the invention modulates light actively, using an array of modulators or sections of arrays which are addressed in several ways.

Implementations of the invention may include one or more of the following features. Individual pixels or arrays of pixels may be connected to a single driver and may be activated independently of any other pixel or pixel array in a technique known as direct addressing. Individual pixels or arrays of pixels may be addressed using a two-dimensional matrix of conductors and addressed in a sequential fashion in a technique known as matrix addressing. Some combination of matrix or direct addressing may be used.

Among the advantages of the invention are one or more of the following.

Because interference modulators are fabricated on a single substrate, instead of a sandwich as in LCDs, many more possible roles are made available. The materials used in their construction are insensitive to degradation by UV exposure, and can withstand much greater variations in temperature. Extremely saturated colors may be produced. Extremely high resolutions make possible detail imperceptible to the human eye. Either transmitted or reflected light may be used as an illumination source, the latter more accurately representing how objects and images are perceived. The ability to fabricate these devices on virtually any substrate makes possible the surface modulation of essentially any man-made or naturally occurring object. It is possible to realize images which are much closer to what exists in nature and more realistic than what is possible using current printing methods.

Interferometric modulation uses incident light to give excellent performance in terms of color saturation, dynamic range (brightness), contrast, and efficient use of incident light, performance which may approach the perceptual range of the human visual system. The fabrication technology allows interference modulators to be manufactured in a great variety of forms. This variety will enable active visual media (and superior static visual media) to become as ubiquitous as the traditional static media which surround us.

In general, the invention provides the tools for creating an array of products and environments which are as visually rich and stimulating as anything found in nature.

Other advantages and features will become apparent from the following description and from the claims.

BRIEF DESCRIPTION OF THE DRAWINGS

FIGS. 3A and 3B are top and side views of a spatially defined mirror. FIG. 3A shows a mirror with a 50% etch while FIG. 3B shows a mirror with a 75% etch.

FIG. 4 is a perspective view of a back-supported IMod with a good fill factor.

FIG. 5A shows the behavior of light within the viewing cone while FIG. 5B shows the behavior of light outside the cone. FIG. 5C shows the performance of an overall array.

FIG. 6A shows a holographically patterned material, FIG. 6B shows a photonic crystal array, FIG. 6C shows a multilayer dielectric array, FIG. 6D shows an array of microlenses, while FIGS. 6E and 6F show side and top views of a supplemental lighting film.

FIG. 7A shows a full-color pixel while FIG. 7B shows detail of a sub-pixel.

FIG. 10A shows the matrix array while FIG. 10B shows a digital driving circuit.

FIGS. 17A and 17B are front views of a direct driven IMod subarray display. FIG. 17A shows a seven segment display while FIG. 17B shows detail of one of the segments.

FIGS. 18A and 18B are top views of a matrix driven subarray display. FIG. 18A shows a matrix display while FIG. 18B shows detail of one of the elements.

FIG. 21A shows the view while FIG. 21B shows the components diagram.

FIGS. 24A, 24B, 24C, 24D, and 24E are views of an IMod display used in a watch application. FIG. 24A shows a perspective view of a watch display, FIGS. 24B, 24C, 24D, and 24E show examples of watch faces.

FIGS. 25A and 25B are views of an IMod display used in a head mounted display application. FIG. 25A shows a head mounted display while FIG. 25B shows detail of the image projector.

FIG. 26A shows a portable information tool, FIG. 26B shows the components diagram, FIG. 26C shows a cellular phone, while FIG. 26D shows a pager.

FIGS. 27A, 27B, and 27D show several examples, FIG. 27C shows a components diagram, FIG. 27E shows a remote control, and FIG. 27F shows another components diagram.

FIG. 28A shows a decorated automobile while FIG. 28B shows the components diagram.

FIG. 29A shows a full billboard, FIG. 29B shows a display segment, and FIG. 29C shows a segment pixel.

FIG. 30A shows the skyscaper, while FIG. 30B shows the components diagram.

FIG. 31A shows the liquid crystal cell in the undriven state while FIG. 31B shows it in the driven state.

FIG. 32A shows the projection system while FIG. 32B shows the components diagram.

FIGS. 33A and 33B are drawings of an IMod array used in an chemical detection device and a components diagram. FIG. 33A shows the detection device while FIG. 33B shows the components diagram.

FIGS. 34A, 34B, and 34C are front and side views of an IMod based automotive heads up display and a components diagram. FIG. 34A shows the front view, FIG. 34B shows the side view, and FIG. 34C shows the components diagram.

FIG. 35A shows the panel while FIG. 35B shows the components diagram.

DETAILED DESCRIPTION OF THE PREFERRED EMBODIMENT

IMod Structures

Figure 1A:
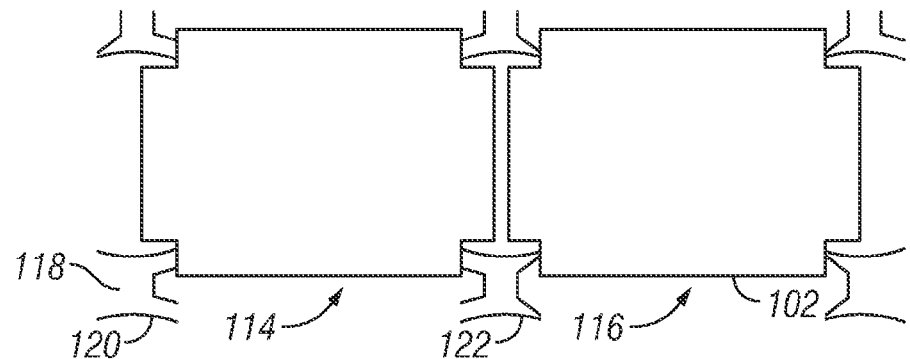
FIGS. 1A and 1B are top and perspective views of an IMod with spatially defined color.
Figure 1B:
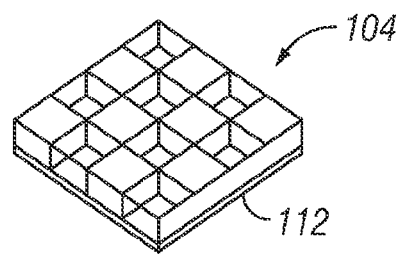

Referring to FIGS. 1A and 1B, two IMod structures 114 and 116 each include a secondary mirror 102 with a corrugated pattern 104 etched into its upper (outer) surface 103, using any of a variety of known techniques. The corrugation does not extend through the membrane 106 on which the mirror is formed so that the inner surface 108 of the mirror remains smooth. FIG. 1B reveals the pattern of etched corrugation 104 on the secondary mirror and the smooth inner surface 112 which remains after etch. The corrugated pattern, which can be formed in a variety of geometries (e.g., rectangular, pyramidal, conical), provides structural stiffening of the mirror, making it more immune to variations in material stresses, reducing total mass, and preventing deformation when the mirror is actuated.

In general, an IMod which has either no voltage applied or some relatively steady state voltage, or bias voltage, applied is considered to be in a quiescent state and will reflect a particular color, a quiescent color. In the previously referenced patent applications, the quiescent color is determined by the thickness of the sacrificial spacer upon which the secondary mirror is fabricated.

Figure 2:
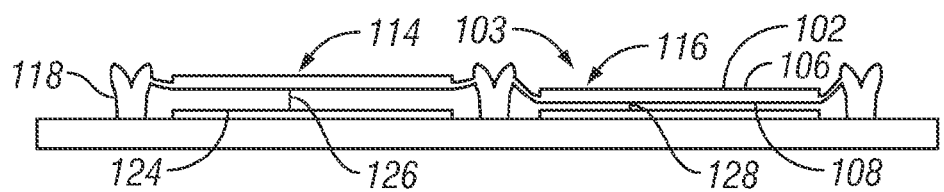
FIG. 2 is a side view of an IMod with spatially defined color.

Each IMod 114, 116 is rectangular and connected at its four corners to four posts 118 via support arms such as 120 and 122. In some cases (see discussion below), the IMod array will be operated at a stated constant bias voltage. In those cases, the secondary mirror 102 will always maintain a quiescent position which is closer to corresponding primary mirror 128 than without any bias voltage applied. The fabrication of IMods with differently sized support arms allows for the mechanical restoration force of each IMod to be determined by its geometry. Thus, with the same bias voltage applied to multiple IMods, each IMod may maintain a different biased position (distance from the primary mirror) via control of the dimensions of the support arm and its resulting spring constant. The thicker the support arm is, the greater its spring constant. Thus different colors (e.g., red, green, and blue) can be displayed by different IMods without requiring deposition of different thickness spacers. Instead, a single spacer, deposited and subsequently removed during fabrication, may be used while color is determined by modifying the support arm dimensions during the single photolithographic step used to define the arms. For example, in FIG. 2, IMods 114, 116 are both shown in quiescent states with the same bias voltage applied. However, the gap spacing 126 for IMod 114 is larger than gap spacing 128 for IMod 116 by virtue of the larger dimensions of its respective support arms.

As shown in FIGS. 3A and 3B, in another technique for achieving spatially defined color, instead of affecting the quiescent position of the movable membrane, one or both of the mirrors (walls) comprising the IMod is patterned to determine its qualities spatially instead of by material thickness.

Thus, in FIG. 3A, mirror 300 has two layers 302 and 304. By etching layer 302 the effective index of refraction of layer 302, and thus the performance of mirror 300, may be altered by controlling the percentage of the layer which remains after the etch. For example, a material with index of 2 maintains that value if there is no etch at all. However if 75% of the material is etched away, the average index falls to 1.75. Etching enough of the material results in an index which is essentially that of air, or of the material which may fill in the etched area.

The mirror layer 308 in FIG. 3B, by contrast has an effective refractive index which is less than that of mirror layer 302. Because the overall behavior of both mirrors is determined by their materials properties, and the behavior of the IMod by the mirror properties, then the color of an IMod incorporating mirror 300 is different from an IMod comprising mirror 306 by virtue of spatially varying, e.g., etching or patterning, one or more of the layers comprising the mirrors. This, again, can be done in a single photolithographic step.

Referring to FIG. 4, in another type of IMod a back supporting mechanism is used instead of an array of posts and support arms (which consume useful surface area on the display). Here, the secondary mirror 402 is mechanically held by support arm 400 at location 406. Arm 400 contacts the substrate 403 at locations 408 where it occupies a minimal footprint, thereby maximizing the amount of area devoted to the mirrors 402, 404. This effect is enhanced by notches 408, 410 which allow mirrors 402 and 404 to conform to the support. Rear support could also be achieved in other ways, perhaps using multiple arms to maintain parallelism. The rear supports can also provide a basis for multilevel conductor lines. For example, an elevated conductor line 412 may be tied to support arm 400. This configuration minimizes the area on the substrate required for such purposes.

Reducing Color Shift and Supplying Supplemental Illumination

Figure 5A:
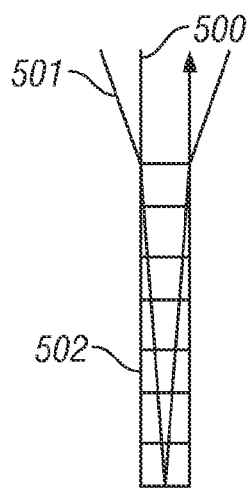
FIGS. 5A, 5B, and 5C are schematic views of an IMod and IMod array with a limited viewing cone.
Figure 5B:
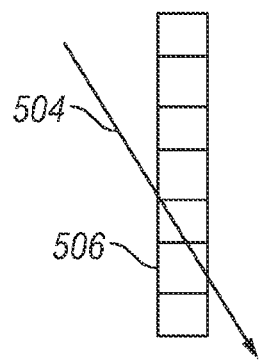
Figure 5C:
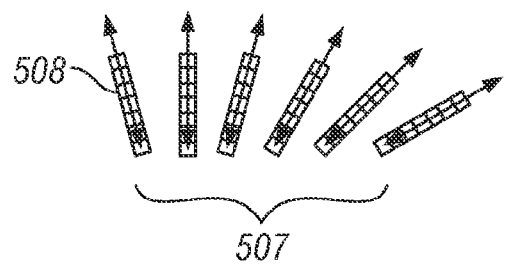

As shown in FIGS. 5A through 5C, to minimize color shift as the angle of incidence changes (a characteristic of interferometric structures) IMod structures 502, 506 are fabricated to have a very high aspect ratio, i.e., they are much taller than they are wide. Consequently, they only exhibit interferometric behavior within a narrow cone 501 of incidence angles. Incident light 500 which is within cone 501, as in FIG. 5A, interacts with the multiple layers (shown by striped sections in the figure) the composition and configuration of which are dictated by the design of the IMod. In general, as indicated in the previous patent applications, these can consist of combinations of thin films of metals, metallic oxides, or other compounds. The important fact being that the geometry of the stack dictates that interference occurs only within a narrow cone of incidence angles. On the other hand, as seen in FIG. 5B, incident light 504 (outside of the cone) is relatively unaffected by the IMod because it interacts with only a very few layers. Such an IMod would appear, say blue, to a viewer who looks at it from a narrow range of angles.

As seen in FIG. 5C, if an array 507 of these structures 508 is fabricated such that they are oriented to cover many different viewing angles then the entire array can appear blue from a much larger range of angles. This random orientation may be achieved, for example, by fabrication on a randomly oriented surface or by random suspension in a liquid medium.

As seen in FIGS. 6A-6F, other techniques for minimizing color shift and for supplying supplemental illumination are possible. In these examples, a specially designed optical film is fabricated on the opposite surface of the substrate from the surface on which the IMod array resides. Such films can be designed and fabricated in a number of ways, and may be used in conjunction with each other.

Figure 6A:
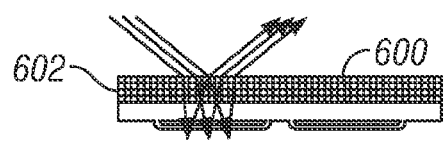
FIGS. 6A, 6B, 6C, 6D, and 6E, 6F are side views of optical compensation mechanisms used for minimizing color shift and enhancing fill factor.

In FIG. 6A, film 600 is a volume or surface relief holographic film. A volume holographic film may be produced by exposing a photosensitive polymer to the interference pattern produced by the intersection of two or more coherent light sources (i.e. lasers). Using the appropriate frequencies and beam orientations arbitrary periodic patterns of refractive indices within the film may be produced. A surface relief holographic film may be produced by creating a metal master using any number of microfabrication techniques known by those skilled in the art. The master is subsequently used to the pattern into the film. Such films can be used to enhance the transmission and reflection of light within a definable cone of angles, thus minimizing off-axis light. The colors and brightness of a display viewed with on axis light are enhanced and color shift is diminished because brightness goes down significantly outside of the cone.

Figure 6B:
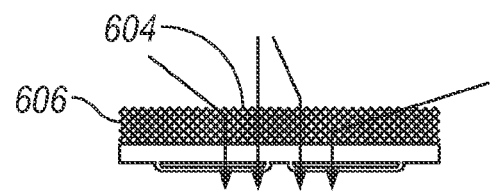

In FIG. 6B, another approach is shown as device 604 in which an array of structures 606 is fabricated on the substrate. These structures, which can be fabricated using the techniques described in the previously referenced patent applications, can be considered photonic crystals, as described in the book "Photonic Crystals", by John D. Joannopoulos, et al., and incorporated by reference. They are essentially three-dimensional interferometric arrays which demonstrate interference from all angles. This provides the ability to design waveguides which can perform a number of functions including channeling incident light of certain frequencies to the appropriately colored pixels, or by changing light of a certain incidence angle to a new incidence angle, or some combination of both.

Figure 6C:
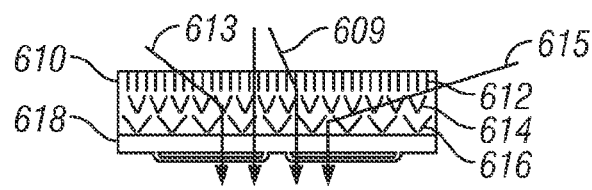

In another example, seen in FIG. 6C, a three-layer polymeric film 610 contains suspended particles 611. The particles are actually single or multi-layer dielectric mirrors which have been fabricated in the form of microscopic plates. These plates, for example, may be fabricated by deposition of multilayer dielectric films onto a polymer sheet which, when dissolved, leaves a film which can "ground up" in a way which produces the plates. The plates are subsequently mixed into a liquid plastic precursor. By the application of electric fields during the curing process, the orientation of these plates may be fixed during manufacture. The mirrors can be designed so that they only reflect at a range of grazing angles. Consequently, light is either reflected or transmitted depending on the incidence angle with respect to the mirror. In this case, layer 612 is oriented to reflect light 609 of high incidence that enters the film 610 closer to the perpendicular. Layer 614 reflects light 613 of lower incidence into a more perpendicular path. Layer 616 modifies the even lower angle incident light 615. Because the layers minimally affect light which approaches perpendicularly, they each act as a separate "angle selective incidence filter" with the result that randomly oriented incident light couples into the substrate with a higher degree of perpendicularly. This minimizes the color shift of a display viewed through this film.

Figure 6D:
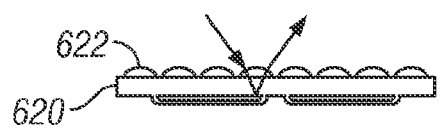

In another example, FIG. 6D, micro lenses 622 are used in an array in device 620. Each lens 622 may be used to enhance the fill factor of the display by effectively magnifying the active area of each pixel. This approach could be used by itself or in conjunction with the previous color shift compensation films.

Figure 6E:
Figure 6F:
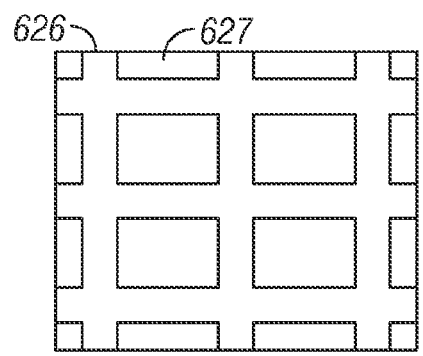

In another example, FIG. 6E, device 624 uses supplemental lighting in the form of a frontlighting array. In this case an organic light emitting material 626, for example, Alq/diamine structures and poly(phenylene vinylene), can be deposited and patterned on the substrate. The top view, FIG. 6F, reveals a pattern 627 which corresponds with the IMod array underneath. That is, the light emitting areas 626 are designed to obscure the inactive areas between the IMods, and allow a clear aperture in the remaining regions. Light is emitted into the substrate onto the IMod and is subsequently reflected back to the viewer. Conversely, a patterned emitting film may be applied to the backplate of the display and light transmitted forward through the gaps between the sub-pixels.

By patterning a mirror on the front of the display, this light can be reflected back upon the IMod array. Peripherally mounted light sources in conjunction with films relying on total internal reflection are yet another approach.

Brightness Control

Figure 7A:
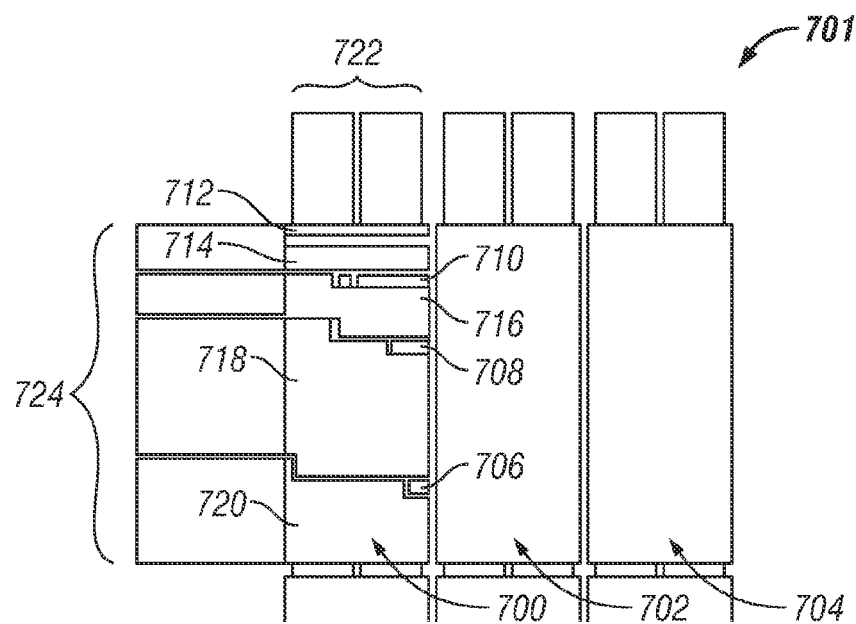
FIGS. 7A and 7B are schematic views of an array which is addressed using spatial dithering.
Figure 7B:

Referring to FIG. 7A, a full color spatially dithered pixel 701 includes side-by-side sub-pixels 700, 702, and 704. Sub-pixel 700, for example, includes sub-arrays of IMods whose numbers differ in a binary fashion. For example, sub-array 706 is one IMod, sub-array 708 is 2 IMods, sub-array 710 is 4 IMods, while sub-array 718 is 128 IMods. Sub-array 712 is shown in greater detail in FIG. 7B. In the arrays, each IMod is the same size so that the amount of area covered by each sub-array is proportional to the total number of IMods in the array. Row electrodes 724 and column electrodes 722 are patterned to allow for the selective and independent actuation of individual sub-arrays. Consequently, the overall brightness of the pixel may be controlled by actuating combinations of the sub-arrays using a binary weighting scheme. With a total of 8 sub-arrays, each sub-pixel is capable of 256 brightness levels. A brightness value of 136 may be achieved, for example, by the actuation of sub-arrays 718 and 712. Color is obtained by combining different values of brightness of the three sub-pixels.

The apparent dynamic range of the display may also be enhanced using a process known as error diffusion. In some applications, the number of bits available for representing the full range of brightness values (dynamic range) may be limited by the capabilities of the drivers, for example. In such a situation, the dynamic range may be enhanced by causing neighboring pixels to have a brightness value, the average of which is closer to an absolute value that cannot be obtained given the set number of bits. This process is accomplished electronically within the controller logic, and can be accomplished without significantly affecting the display resolution.

Digital Driving

Figure 8:
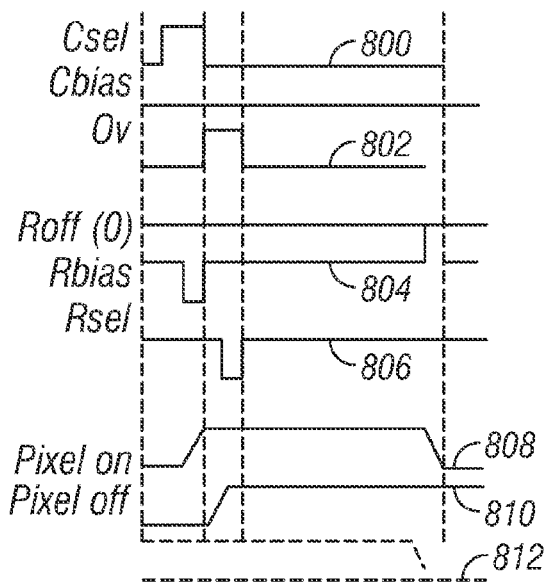
FIG. 8 is a timing diagram for driving a binary IMod.
Figure 9:
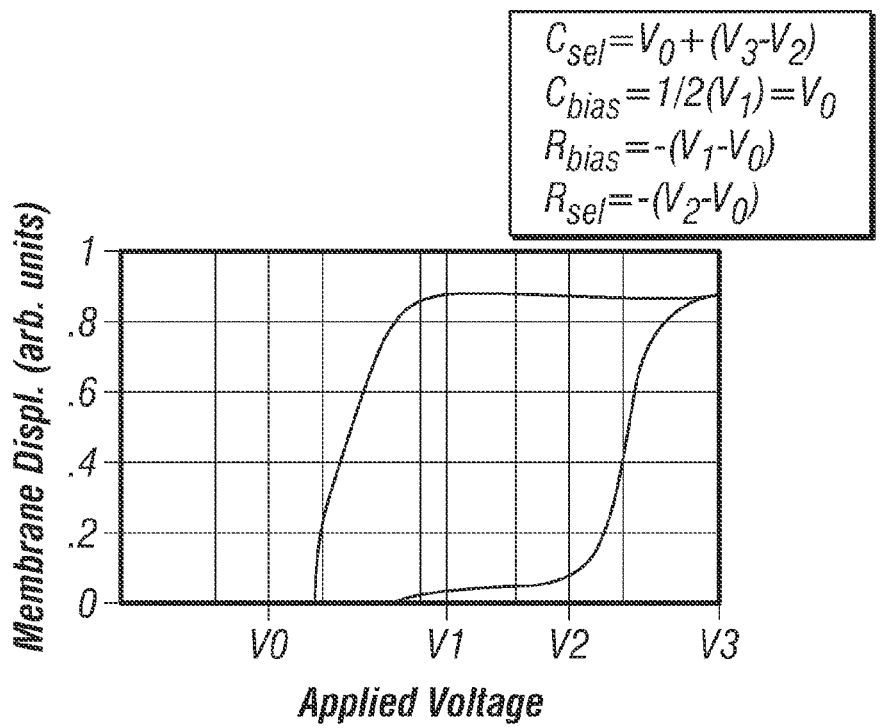
FIG. 9 is a diagram of the hysteresis curve for an IMod device.

In a digital driving scheme, as shown in FIGS. 8, 9, and 10, FIG. 8 is a timing diagram showing one set of voltages required to actuate a matrix addressed array of IMods. Column select pulses 800 and 802 are representative of what would be applied to a particular column. Further detail is revealed in pulse 800 which is shown to switch from voltage level Cbias to voltage Cselect. Row select pulses 804 and 806 are also shown, with 804 revealing that the required voltage levels are Rselect, Rbias, and Roff (0 volts). When a column select pulse is present, and a row select pulse is applied, the pixel which resides at the intersection of the two is actuated as shown in the case of pixel 808 which resides on the row driven by select pulse 804, and subsequently in pixel 810, which resides on the row driven by pulse 806. When select pulse 804 is driven to the Roff level, pixel 808 is turned off. Pixel 812 illustrates the behavior of a pixel in an arbitrary state when a Roff value is placed on the row line, i.e., if it is on it turns off, or if it is off it remains off.

In FIG. 9, the voltages are shown in the context of a hysteresis curve which is typical of an IMod. As the applied voltage is increased, the membrane does not move significantly until the value rises beyond a certain point, which is known as the collapse threshold. After this point, the membrane undergoes full displacement. This state is maintained until the voltage is dropped below a point where actuation began. Several conditions must be met in order for this scheme to be successful. The combination of Csel and Rsel must be higher than the collapse threshold voltage, the combination of Cbias and Rsel must not fully actuate the membrane, the combination of Cbias and Rbias must maintain a displaced state, and the combination of Roff and Cbias must free the membrane.

Figure 10A:
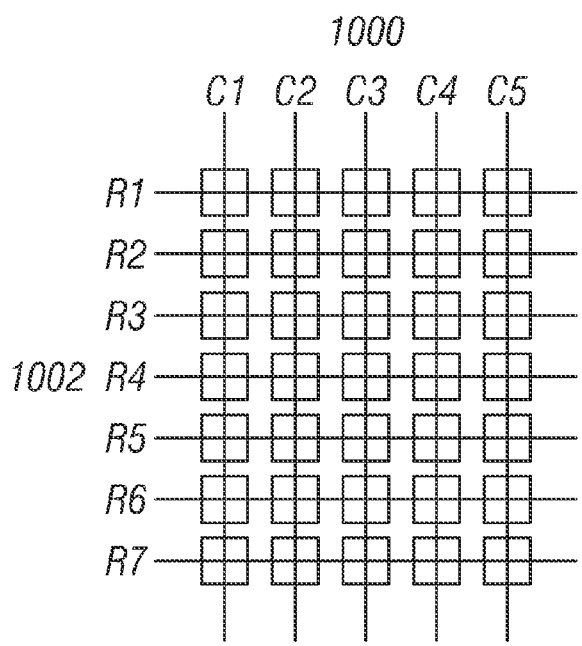
FIGS. 10A and 10B are a top view of an IMod array which is connected for matrix addressing and a digital driver.
Figure 10B:
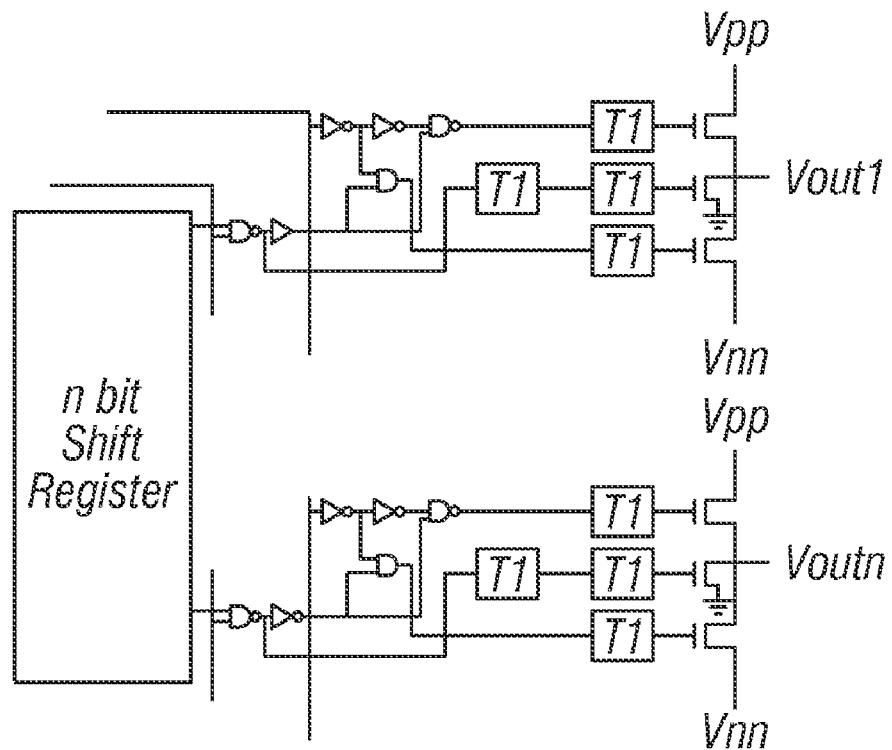

FIG. 10A is representative of a typical matrix addressed array illustrating column lines 1000 and row lines 1002. FIG. 10B illustrates a typical shift register based driver circuit. The size of the display array and the number of bits in the register would determine how many of these components would be required for both rows and columns. Bits corresponding to the appropriate row and column values are shifted into the register and loaded on the outputs when they are required during the course of the scanning the display.

Viewing Modes

Figure 11:
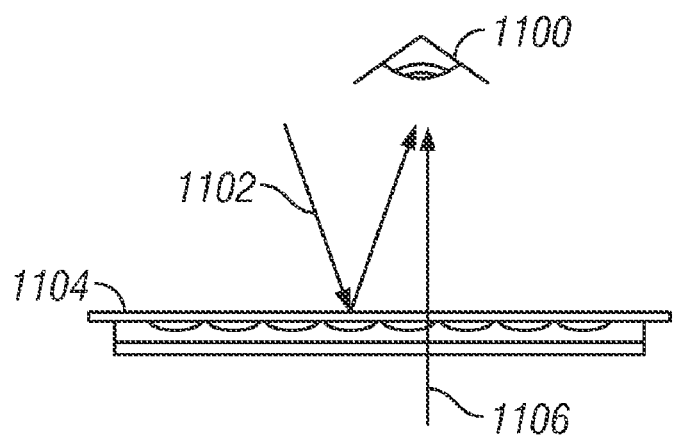
FIG. 11 is a side view of an IMod array configured for direct viewing.

Referring to FIG. 11, among the different generic ways to view an IMod display 1104 (the best one being selected based on the particular product application) are a direct viewing mode with the viewer 1100 perceiving the display without the aid of an image forming optical system. Direct viewing can occur in reflection mode, using reflected light 1102, or transmitted mode, using transmitted light 1106, or some combination of the two.

Figure 12:
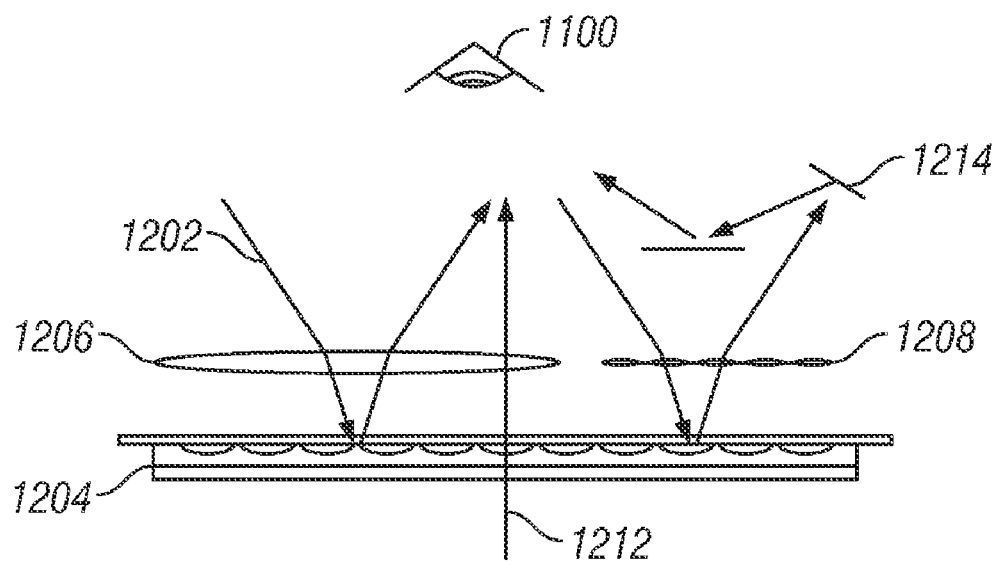
FIG. 12 is a side view of an IMod array configured for direct viewing through an optical system.

In another example, FIG. 12, direct viewing configurations may rely on intervening optics to form an image from an image source generated by IMod display 1204.

Reflected light 1202 or transmitted light 1212, or a combination of the two, may be manipulated by macro lens system 1206. A more complicated or space critical application might require more elaborate optics. In such a case, a lens system might be implemented using a micro-lens array 1208 with or without the aid of redirection mirrors 1214.

Figure 13:
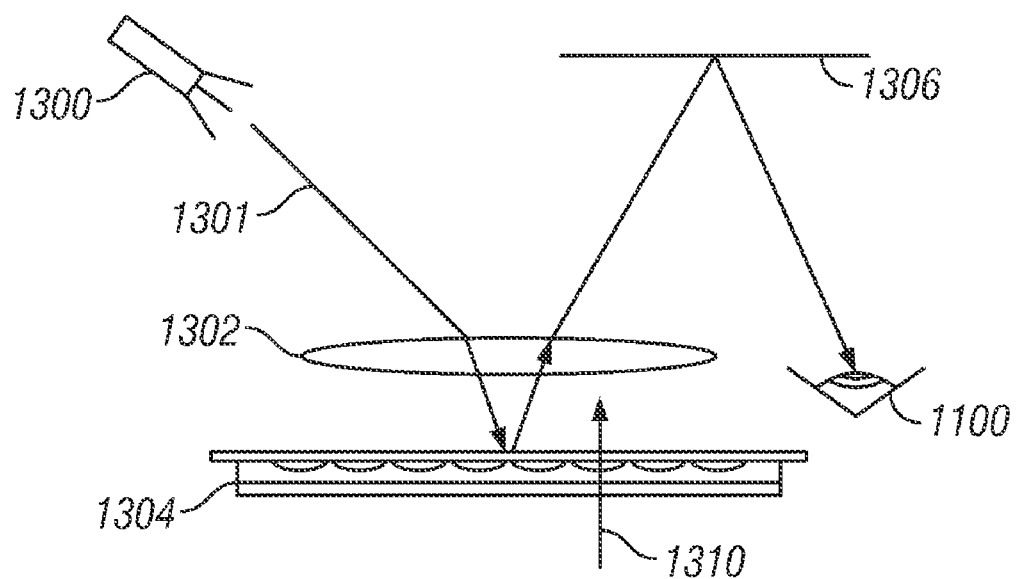
FIG. 13 is a diagram of an IMod array configured for indirect viewing.

In FIG. 13, indirect viewing may be achieved with respect to an image generated by display 1304 using either transmitted light 1310 or reflected light 1301 from light source 1300. Lens system 1302 is then used to form an image on viewing surface, 1306, which is where the viewer perceives the image.

Packaging and Driving Electronics

Figure 14:
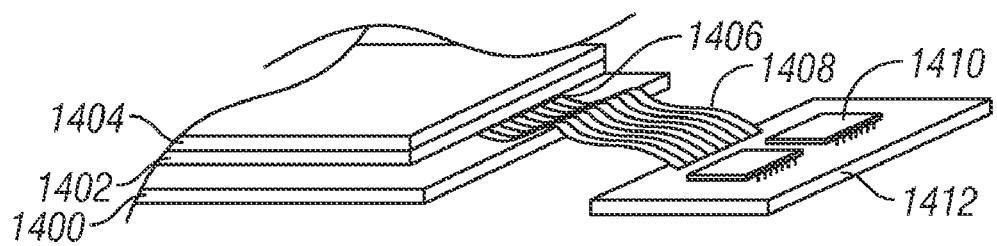
FIG. 14 is a perspective view of an IMod array and a separate driver/controller.
Figure 15:
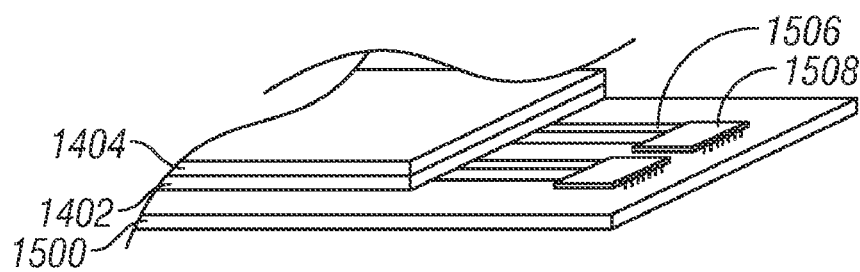
FIGS. 15 and 16 are perspective views of IMod arrays and driver/controllers on the same substrates.
Figure 16:
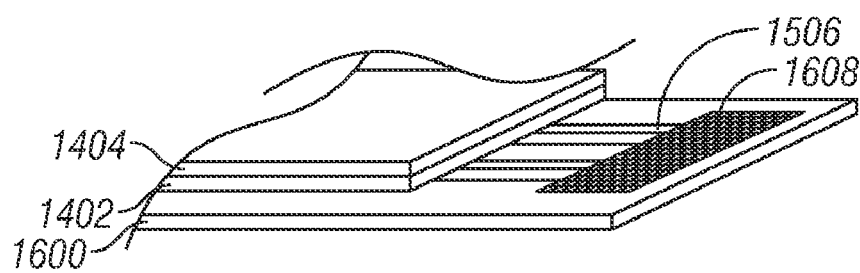

Referring to FIGS. 14 through 16, different techniques for packaging and providing driver electronics are illustrated in order of degree of integration. FIG. 14 shows a configuration requiring two separate substrates. The IMod display array resides on substrate 1400 which could be any one of a variety of materials described in the referenced patent applications. The IMod array is not shown because it is obscured by backplate 1404, which is bonded to substrate 1400 via seal 1402. Backplate 1404 can also be of a number of different materials with the primary requirement being that it be impermeable to water, and that its thermal coefficient of expansion be close to that of the substrate. Seal 1402 can be achieved in a number of ways. One approach involves the application of an epoxy but this results in the generation of gases during the curing process which may interfere with the operation of the devices. Another approach involves fusion or eutectic bonding which utilizes heat to create a chemical or diffusion bond between two materials, in this case the substrate and the backplate. This process may be enhanced by forming a bead, in the form of seal 1402, of additional materials such as silicon, aluminum, or other alloys which tend to bond well. This process may be further enhanced using a technique known as anodic bonding. This is similar to fusion bonding except that a voltage potential is applied across the backplate and substrate. This allows the bond to occur at a lower temperature. Other techniques are also possible.

The electronics 1410 comprise all of the row and column drivers, memory, and controller logic required to actuate the IMods in a controlled fashion. Exactly where each of these functions reside would depend on the application and degree of integration required for an application. Specific examples will be discussed in subsequent portions of this patent application. In FIG. 14, the drive electronics 1410 are shown mounted on substrate 1412. A connection is made between this substrate 1412 and the display substrate 1400, by ribbon cable 1408 and subsequently to the display array via conductors 1406. Many techniques exist for patterning the fine array of conductors for ribbon cable, as well as for connecting them to disparate substrates.

FIG. 15 shows a display where the electronics have been mounted on the display substrate. Display substrate 1500 serves as a support not only for the IMod array but also for the integrated circuits 1508. Conductors 1506 are patterned to create appropriate paths between the ICs and the array. ICs 1508 may be mounted on the substrate using a number of techniques including TAB mounting and chip-on-glass techniques which rely on anisotropically conducting films.

FIG. 16 shows a display which includes fully integrated electronics and can be achieved in two fundamental ways.

In one case, substrate 1600 is an electronically inactive medium upon which the IMod array and electronics 1608 are fabricated separately or in a fabrication process with some overlap. Electronics may be fabricated using a number of techniques for building thin film transistors using materials such as amorphous silicon, polysilicon, or cadmium selenide. Electronics may also be fabricated using microelectromechanical (MEM) switches instead of, or in conjunction with thin film transistors. All of these materials are deposited on the surface of the substrate, and provide the electronically or electromechanically active medium for circuits. This implementation demonstrates a powerful approach to surface micromachining, which could be described as epi-fab. Essentially, in epi-fab all components of any microelectromechanical structure, both the mechanical and the electronic, are fabricated entirely on the surface of an inert substrate.

In the second case, the substrate is active silicon or gallium arsenide and the electronics are fabricated as a part of it. The IMod array is then fabricated on its surface. The electronics may also include more complex electronic circuits associated with the particular applications. Application specific circuits, e.g., microprocessors and memory for a laptop computer can be fabricated as well, further increasing the degree of integration.

FIGS. 17A and 17B show two drive/connection schemes. Direct drive is illustrated by a seven segment display 1700. A common conductor 1702 connects all of the segments 1703 in parallel. In addition, separate segment conductors 1704 go to each segment individually. As shown in FIG. 17B, in a detailed corner 1712 of one segment, an array of IMods 1708 are connected in parallel and would be connected as a group to a segment conductor 1704 and the common conductor 1702. The general microscopic nature of this type of IMod structure makes it necessary to group the IMods together to form larger elements to allow for direct viewing of the display. Application of a voltage between a selected one of the segment conductors and the common conductor actuates all of the IMods within that segment. The direct drive approach is limited by the fact that the number of conductors becomes prohibitive if the number of graphical elements gets large enough.

Referring to FIGS. 18A and 18B, an active matrix drive approach is shown. Row lines 1800 and column lines 1804 result in a two-dimensional array the intersections of which provide pixel locations such as 1802. As seen in FIG. 18B, each of the pixel locations 1802 may be filled with an array of parallel connected IMods 1803. In this scheme a common conductor 1808 may be connected to the row line, and the IMod array conductor, 1810, may be connected to the column line, though this could be reversed.

Product and Device Applications

The remaining figures illustrate product and device applications which use the fabrication, drive, and assembly techniques described thus far.

The IMod as an easily fabricated, inexpensive, and capable modulator can be placed in an exceptional number of roles which require the manipulation of light. These areas fall into at least two categories: IMods which are used to modulate or otherwise affect light for purposes which do not result in direct visually perceived information (embedded applications); and IMods which are used to convey codified, abstract or other forms of information via light to be visually perceived by an individual (perceived applications). All of these applications, both embedded and perceived, can be roughly divided according to array size and geometry, however these boundaries are for descriptive purposes only and functional overlap can exist across these categories. They do not represent an exhaustive list of possibilities.

One category of applications utilizes single or individual modulators which are generally for embedded applications. These maybe coupled to optical fibers or active electronics to provide, among other things, a mechanism for selecting specific frequencies on a wavelength division multiplexed fiber-optic communication system, as well as a low data rate passive fiber optic modulator. Single modulators may be coupled to semiconductor lasers to provide, among other things, a mechanism for selecting specific frequencies transmitted by the laser, as well as a low data rate laser modulator. Single modulators may be coupled to optical fibers, lasers, or active electronics to alter the phase of light reflected.

Linear arrays, though generally for embedded applications, also begin to have potential in perceived roles. Devices for printing imagery may utilize a linear array as the mechanism for impressing information on to reflected or transmitted light which is subsequently recorded in a light sensitive medium. Devices for scanning images may utilize a linear array to select different colors of a printed or real image for subsequent detection by a light sensitive device.

Yet another category of applications includes microscopic two-dimensional arrays of IMods which may be used to provide reconfigurable optical interconnects or switches between components. Such arrays may also be used to provide optical beam steering of incident light. Using a lens system, to be discussed later, may allow such an array to be readable.

Small arrays, on the order of 2" square or smaller, may find a variety of uses for which this size is appropriate. Applications include direct view and projection displays. Projection displays can be used individually or in arrays to create virtual environments (VEs). A theater is an example of a single channel VE, while an omnimax theater, with many screens, represents a multi-channel virtual environment. Direct view displays can be used for alphanumeric and graphic displays for all kinds of consumer/commercial electronic products such as calculators, cellular phones, watches and sunglasses (active or static), jewelry, decorative/informative product labels or small format printing (business card logos, greeting card inserts, product labels logos, etc.); decorative clothing patches or inserts (sneakers, badges, belt buckles, etc.); decorative detailing or active/static graphic printing on products (tennis rackets, roller blades, bike helmets, etc.); and decorative detailing or active/static graphic printing on ceramic, glass, or metal items (plates, sculpture, forks and knives, etc.). Very large (billboard sized) displays may be produced by combining arrays of small arrays which are themselves directly driven. Embedded applications may include spatial light modulators for optical computing and optical storage. Modulator arrays fabricated on two dimensional light sensitive arrays, such as CCDs, may be used as frequency selective filter arrays for the selection of color separations during image acquisition.

Another size category of devices, medium arrays, may be defined by arrays of roughly 2" to 6" square. These include direct view displays for consumer electronic products including organizers, personal digital assistants, and other medium sized display-centric devices; control panels for electronic products, pocket TVs, clock faces (active and static); products such as credit cards, greeting cards, wine and other product labels; small product exteriors (walkmen, CD cases, other consumer electronic products, etc.); and larger active/static graphical patches or inserts (furniture, clothing, skis, etc.)

For arrays on the order of 6" to 12" square, large arrays, there exist other compelling applications. These include direct view displays for large format display-centric products (TVs, electronic readers for digital books, magazines and other traditionally printed media, special function tools); signs (window signs, highway signs, public information and advertising signs, etc.); large consumer product exteriors/active surfaces and body panels (microwave oven, telephone, bicycle, etc.); and furniture exteriors and lighting fixtures, high end products. Direct view 3-D displays and adaptive optics are also possible.

Arrays approximately 12" square or larger, and aggregate arrays (which are combinations of smaller arrays to achieve a larger one), further define a unique set of devices, and provide the potential to affect our overall environment. These include direct view displays for very large formats (billboards, public spaces, highway, industrial/military situation displays, etc.); Body panels and active exteriors for very large products (cars, motorcycles, air and water craft, sails, refrigerators); and active/static exteriors/interiors for very large objects (buildings, walls, windows).

Figure 19:
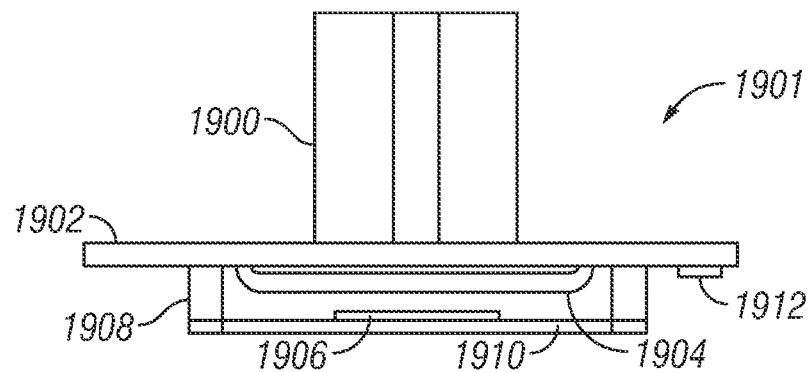
FIG. 19 is a side view of an IMod based fiber optic endcap modulator.

In FIG. 19, a fiber optic detector/modulator 1901 includes a single IMod 1904. An optical fiber 1900 is bonded to substrate 1902. IMod 1904 resides on the substrate which is bonded to backplate 1910 by a seal 1908 using anodic bonding for example. The backplate also serves as a substrate for detector 1906. Electronics 1912 are mounted on substrate 1902 via chip-on-glass or some other previously described technique. Device 1901 could provide a number of functions depending on the nature of the IMod.

For example, a reflective mode IMod could act as a modulator of light which is incident through the optical fiber. Using a design which switches between absorbing or reflecting, the intensity of the reflected light may be modulated. Using a transmissive IMod, the device could act as a transceiver. Switching the IMod between fully transmissive or fully reflective would also modulate the reflected light and thus perform as a data transmitter. Holding it in the fully transmissive state would allow the detector 1906 to respond to light incident through the fiber, thus acting like a receiver. Use of a tunable IMod would allow the device to act as a frequency sensitive detector, while not precluding modulation as well.

Figure 20:
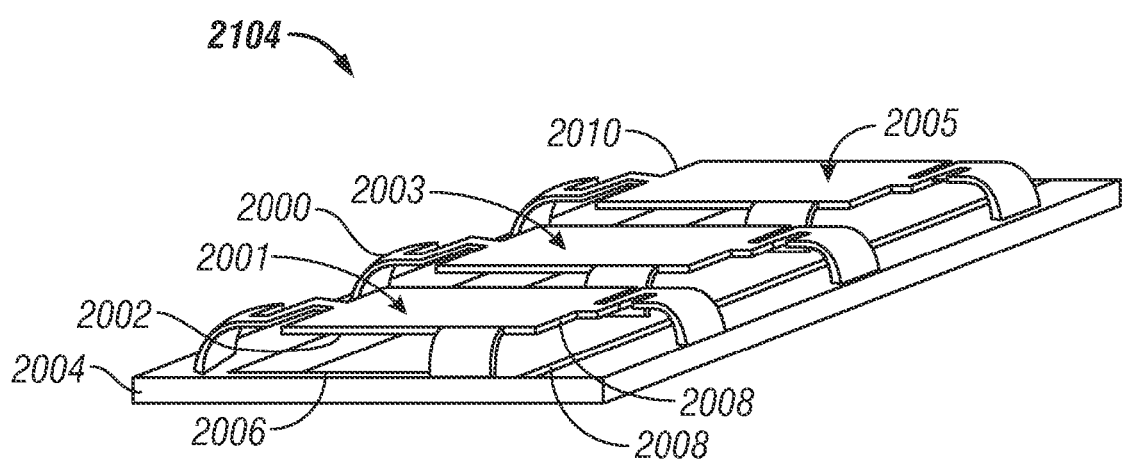
FIG. 20 is a perspective view of a linear tunable IMod array.
Figure 21A:
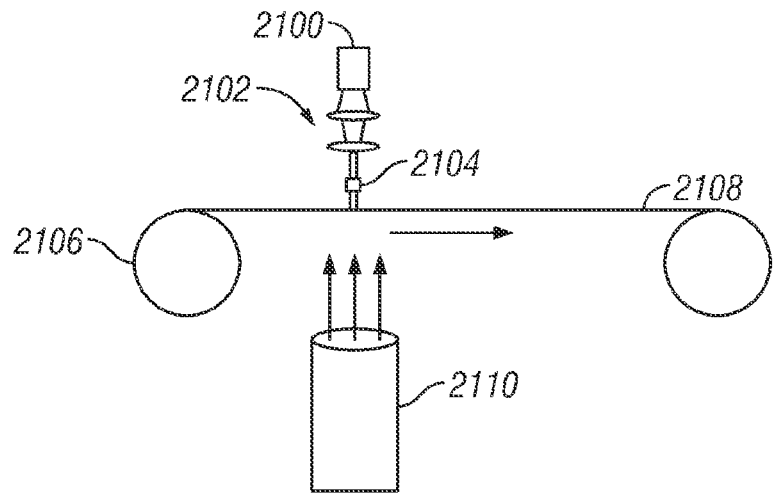
FIGS. 21A and 21B are a representational side view of a linear IMod array used in an imaging application and a components diagram.

Referring to FIGS. 20 and 21A, a linear array 2104 of IMods 2001, 2003, 2005 is supported on a substrate 2004.

Each of the IMods includes a primary mirror 2006, a secondary mirror 2002, electrodes 2008, support arms 2000, and support plate 2010. Each IMod would be driven separately in a binary or analog fashion depending on the application. In the representative application shown in FIG. 21A, a transport mechanism 2106 moves a medium 2108 past a linear IMod array 2104 (the axis of the array is into the page). Two potential applications for such a configuration could include image acquisition or digital printing. In acquisition mode, component 2100 is a detector array which is coupled to IMod array 2104 via lens system 2102. Component 2110 acts as a light source, illuminating pre-printed images which reside on media 2108. By using the IMod as a tunable filter array, specific colors of the image on the media may be selected and detected, allowing for high resolution capture of graphical information residing on the media.

Figure 21B:
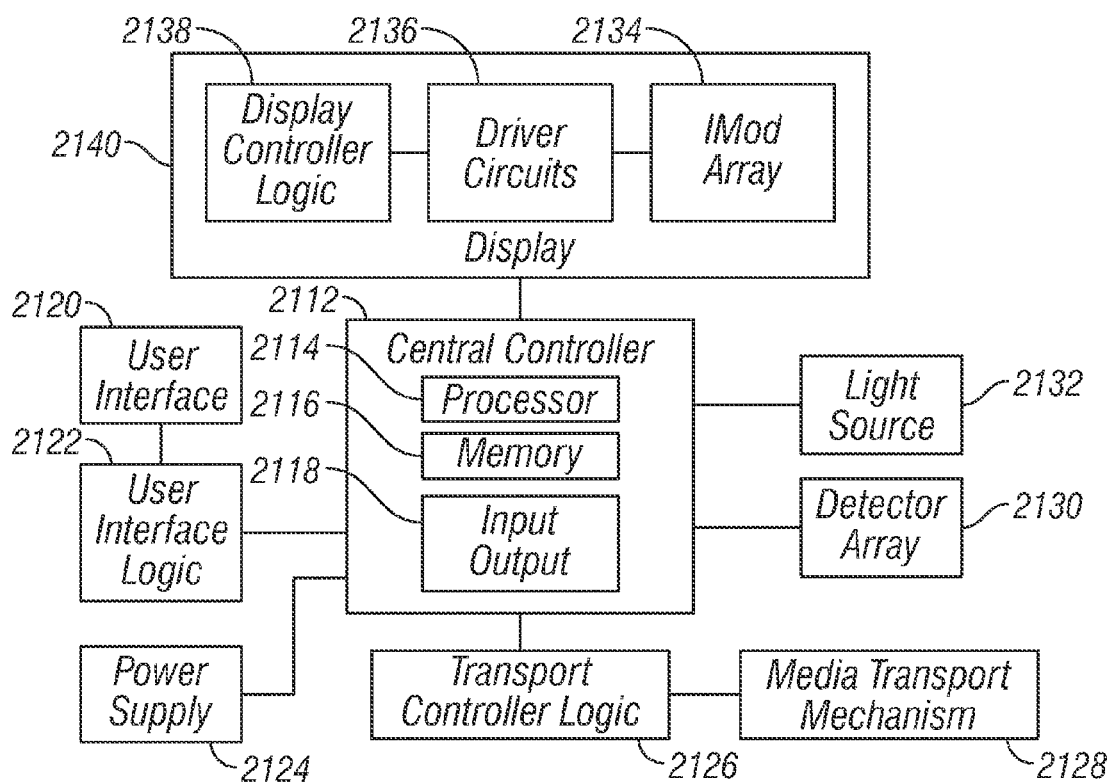

Alternatively, component 2100 could be a light source which uses lens system 2102 to couple and collimate light through IMod array 2104 onto media 2108. In this case, the media would be a photosensitive material which would undergo exposure as it passed beneath the array. This would provide a mechanism for the printing of high resolution color images. No electronic components reside on the array substrate in this example. FIG. 21B shows a components diagram illustrating one way in which this product could be implemented using off-the-shelf components. In this case, they comprise a central controller 2112, (including processor 2114, memory 2116, and low level I/O 2118), high level I/O components (user interface 2120 and logic 2122, detector array 2130), control components (light source 2132, media transport 2128 and logic 2126), display 2140 (logic 2138, drivers 2136, IMod array 2134) and power supply 2124. The central controller handles general purpose operational functions, the high level I/O components and display dictate how information gets in and out of the product, and the controller components manipulate peripheral devices.

Figure 22:
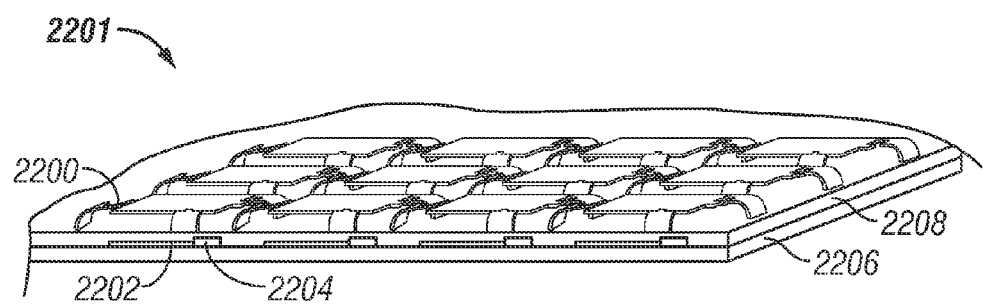
FIG. 22 is a perspective view of a two-dimensional tunable IMod array.

Referring to FIG. 22, a two-dimensional IMod device 2201 is fabricated directly on a photosensitive detector array 2206 such as a charge coupled device (CCD) or other light sensitive array. Array 2206 has photosensitive areas 2202 and charge transport and IMod drive electronics 2204. Planarization layer 2208, deposited on the CCD, provides a flat surface for the fabrication of the IMod array 2200. Such a layer could be in the form of a curable polymer or spun-on oxide. Alternatively, some form of chemical mechanical polishing might be used to prepare an optically smooth surface on the integrated circuit. Device 2201 provides a fully integrated 2-D, tunable light detection system which can be used for image capture or image printing (if the detector is replaced with a light source).

Figure 23:
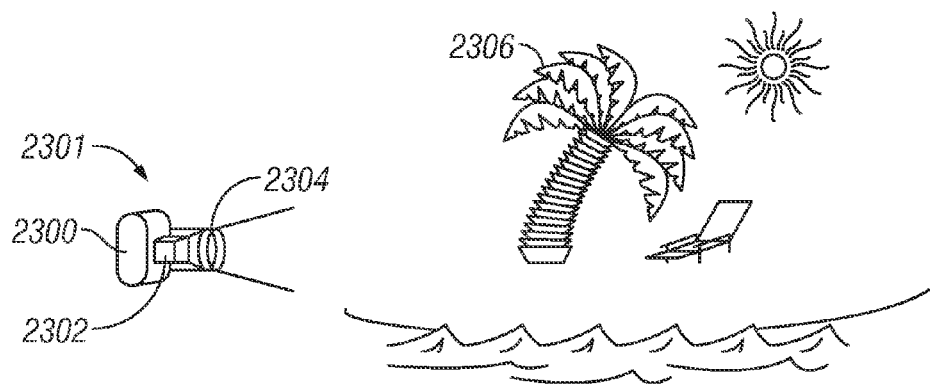
FIG. 23 is a perspective view of a two-dimensional IMod array used in an imaging application.

FIG. 23 illustrates a digital camera 2301 based on this device. Camera body 2300 provides mechanical support and housing for lens system 2304 and electronics and IMod detector array 2302. Scene 2306 is imaged on the surface of the array using the lens system. By tuning the IMod array to the frequencies of light corresponding to red, green, and blue, a full color image may be acquired by combining successive digital exposures. Hyperspectral imagery (in other wavelength regions such as ultraviolet or infrared) may be obtained by tuning to frequencies between these points. Because of the high switching speed of the IMods, all three images may be acquired in the time it takes a conventional camera to capture one.

Referring to FIG. 24A, an application for small-sized displays is a digital watch 2400 (the back side of the watch is shown in FIG. 24A) which includes a reflective IMod display at its core. The IMod display comprises an IMod array 2402 and drive electronics, 2404. The display (see examples in FIGS. 24B-24E) could vary in complexity from separate graphic elements driven in a direct drive manner, to a dense array using active matrix addressing, or some combination. The electronics could be fabricated on glass using polysilicon or amorphous silicon transistors, or MEM switches. While the direct drive approach would still exploit the saturated appearance of the IMod, a dense array would allow for the selection of arbitrary or pre-programmed graphical patterns such as FIG. 24B. This would add an exciting new fashion component to watches not unlike the art oriented Swatch® only in electronic form. Owners could select from a series of preprogrammed displays 2408 (FIG. 24D), say by pushing the stem, or download limited edition displays digitally from their favorite artists.

Referring to FIG. 25A, a small transmissive IMod array is shown in a head mounted display 2511. Support 2508 provides a frame for mounting the display components and the viewer screen 2512. Referring also to FIG. 25B, the display includes a light source 2500, an IMod array 2502, a lens system 2504, and a reflector 2506. The display is used in indirect mode with the image formed on screens 2512 for the benefit of viewer 2510. Alternatively, the IMod array could be formed directly on the screen itself and thus be used in direct view mode. In both cases, the display could function to provide aesthetic imagery which could be seen by other individuals and provide an appealing dynamic external look.

Figure 26A:
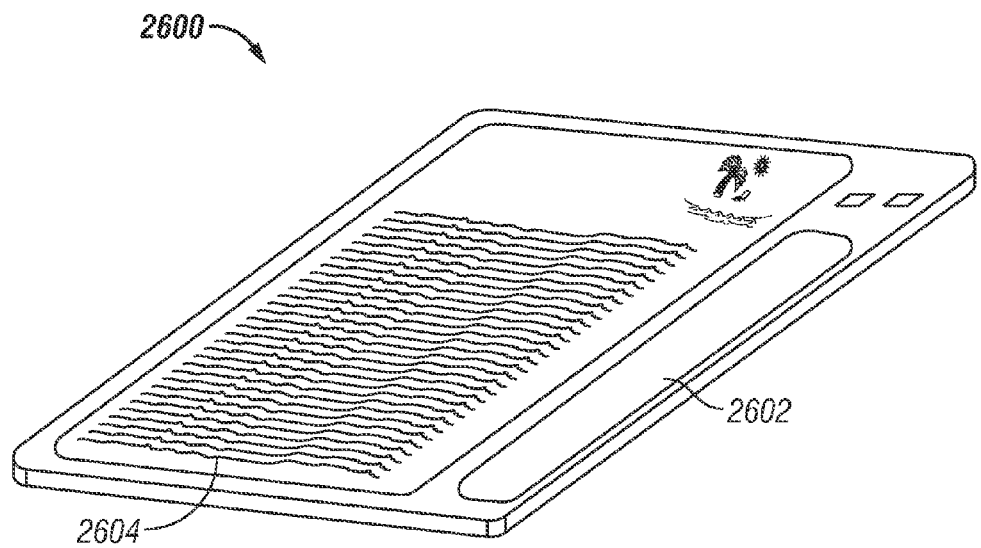
FIGS. 26A, 26B, 26C, and 26D are perspective views of an IMod display used in several portable information interface applications and a components diagram.
Figure 26B:
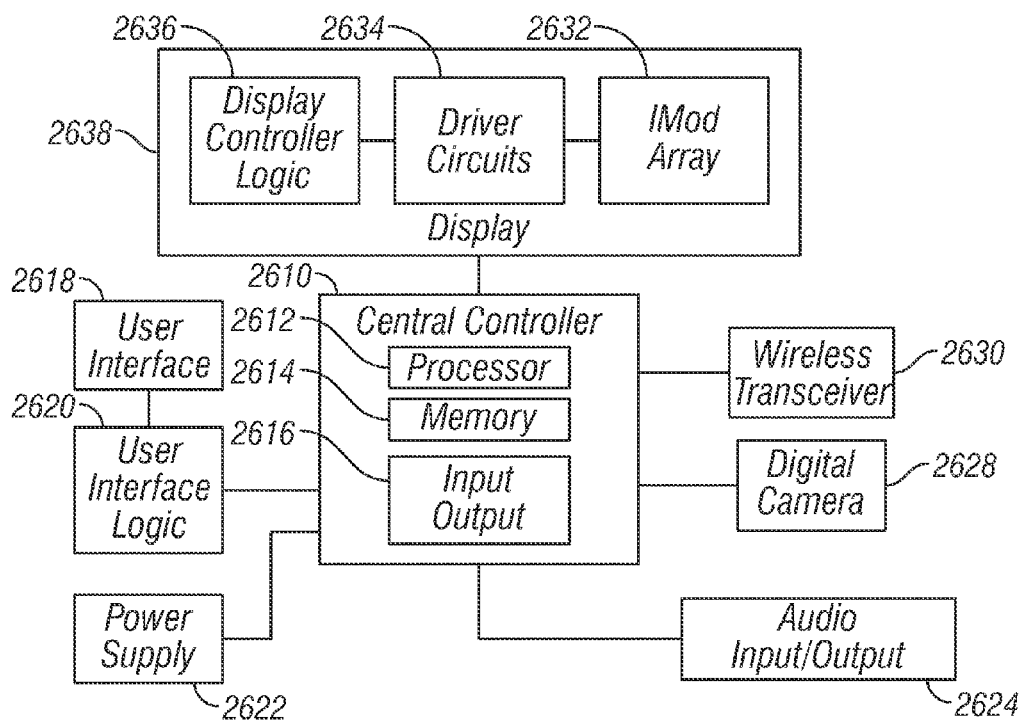
Figure 26C:
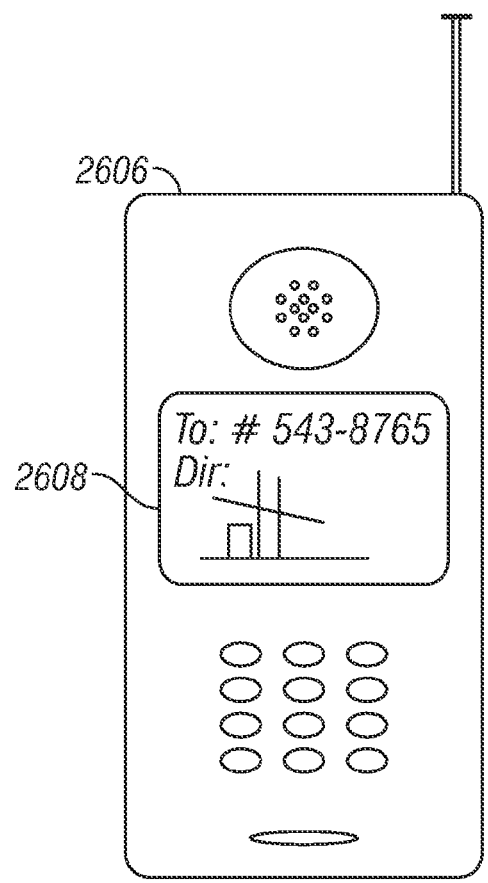
Figure 26D:
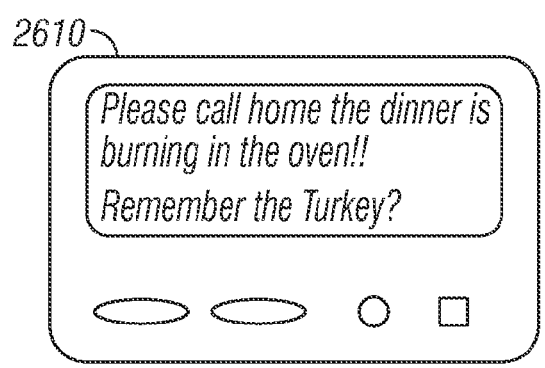

Referring to FIGS. 26A through 26D, an IMod display 2604 is shown in a product with a very wide range of applications. In this case, the display is used in direct view mode, and could come in a variety of sizes depending on the specific product, but ranging in size from several inches across to about one foot diagonal. The primary goal is for a device that has a very small footprint and/or is portable, and the scheme is to facilitate mobility. The device 2600 could be described as a personal information tool, a portable digital assistant, a web browser, or by various other titles which are only now being coined to describe this class of products. In general its purpose would be to serve as a media interface for a variety of information gathering, processing, and dissemination functions, or as a mobile or stationary peripheral for a centralized processing station to which it is connected, perhaps via the internet or some wireless communications medium. A specialized peripheral in a home-based application might be a kitchen cooking assistant which would be portable and present easily readable recipes by virtue of the display and the fact that most of its processing is located in some other unit. Many other variations on this theme are possible. This tool comprises a display 2604 and some basic controls 2602. Internal components would include some combination of processing electronics, information storage, and communications hardware. Representative products range from personal organizers and digital books and magazines, to application specific tools (construction, medical, scientific) or tools for browsing the internet. Techniques for operating such a tool are varied and could range from voice recognition, to touch sensitive screens. However, all of the products would have the ability to digitally display graphical information using reflected (preferred) or transmitted light with highly saturated colors. Because it is digital, the complexity and cost of the driving electronics would be significantly reduced, and because it can use reflected light, the power consumption is extremely low while the performance remains high. These two characteristics make such a high performance display oriented product viable from an economic and portability perspective. FIG. 26C is an example of one kind of personal communications device, a cellular phone in this case though the pager of FIG. 26D is an example of another. Display 2608 is capable of displaying both graphical and text information. FIG. 26B shows a components diagram illustrating one way in which these products could be implemented using available off-the-shelf components. In this case, they comprise a central controller 2610 (including processor 2612, memory 2614, and low level I/O 2616), high level I/O components (user interface 2618 and logic 2620, audio I/O 2624, digital camera 2628, and wireless transceiver 2630), display 2638 (logic 2636, drivers 2634, IMod array 2632) and power supply 2622. The central controller handles general purpose operational functions, while high level I/O components dictate how information gets in and out of the product.

Figure 27A:
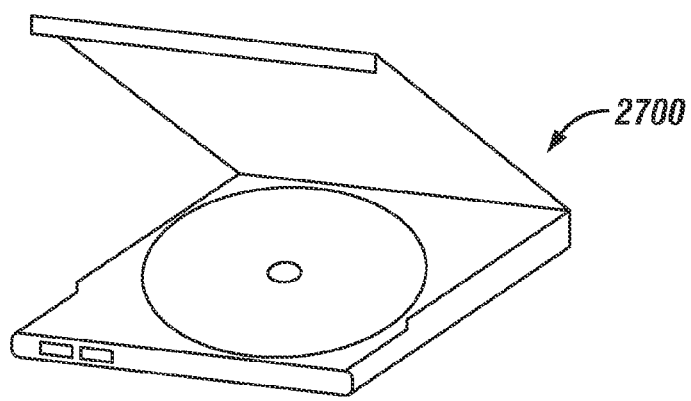
FIGS. 27A, 27B, 27C, 27D, 27E, 27F and 27G are views of an IMod display used in applications for information and decorative display, a remote control, and components diagrams.
Figure 27B:
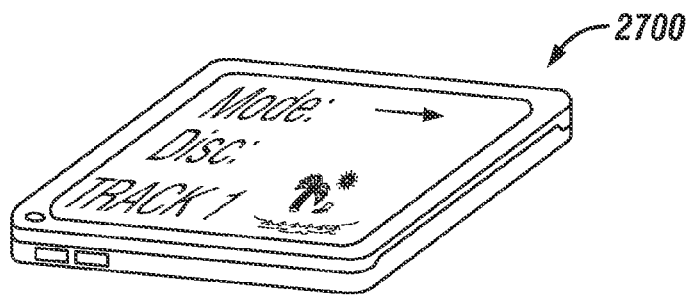
Figure 27C:
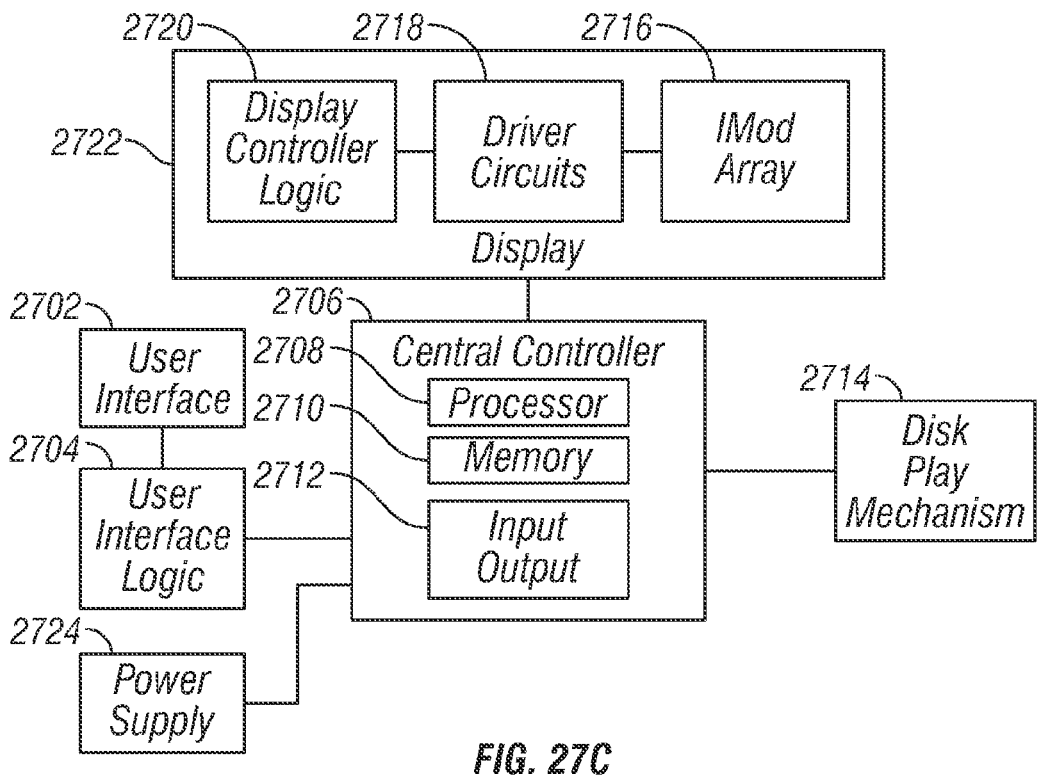

Referring to FIG. 27A through 27G, several applications are shown which emphasize the aesthetic nature of an IMod display as well as its information conveying aspect. An IMod display could be included in a portable compact disc player 2700 of the kind that serves as a commodity status device made by many manufacturers. By virtue of an IMod display, a larger fraction of the exterior of the player may be devoted to information display functions, indicating status of the device as well as tracks playing. Because it consumes such a large fraction of the exterior, it would be possible to have the display play a more significant role in the appearance of the CD player. Static as well as dynamic patterns and images could be displayed which may or may not have any connection with the status of the player. However, because of the rich saturated colors, the appearance becomes a significant and distinct selling point for the manufacturer. This concept holds true for any number of consumer electronic devices whose form and function could be enhanced by an active exterior. A microwave oven which pulsed red when the food was done, or a bread baking machine whose exterior changed colors as the baking process progressed are just two examples. FIG. 27C shows a components diagram illustrating one way the CD player could be implemented using off-the-shelf components. In general, they comprise a central controller 2706 (including processor 2707, memory 2710, and low level I/O 2712), high level I/O components (user interface 2702 and logic 2704), display 2722 (logic 2720, drivers 2718, IMod array 2716) disc player mechanism 2714, and power supply 2724. The central controller handles general purpose operational functions, high level I/O components dictate how information gets in and out of the product, and the disc play mechanism manipulates mechanical servos.

Figure 27D:
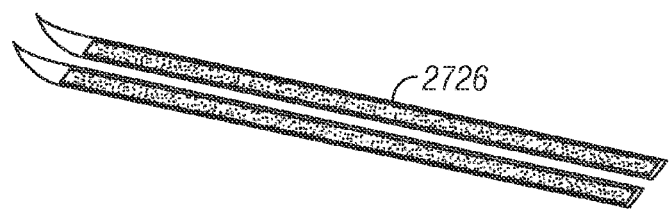
Figure 27E:
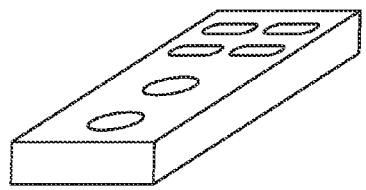
Figure 27F:
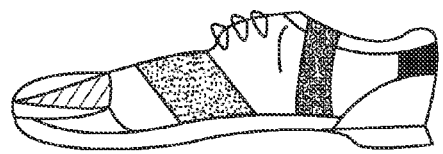
Figure 27G:
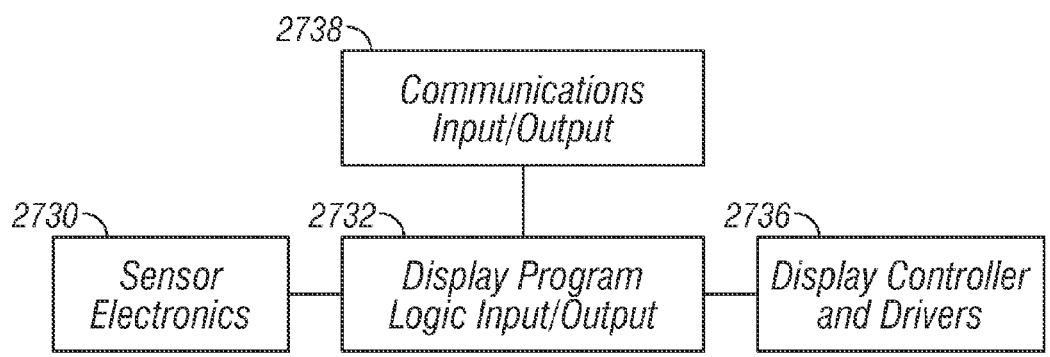

The skis of FIG. 27D and the sneaker of FIG. 27F are examples of consumer goods which could benefit purely from the aesthetic potential for an active exterior. In both cases, an IMod array has been fabricated on a substrate, for example flexible plastic, along with electronics and integrated into the product using any number of techniques currently used for incorporating or laminating composite pieces into fabric or solid composites. Power could be supplied by piezoelectric like devices which convert the mechanical power of movement (e.g., ski flexing or walking) into electricity. Remote control, FIG. 27E, could be used to effect control over the images displayed. Further control could be exhibited to reflect the mode of use of the product. In the case of the skis, the pattern might become more dynamic as the skier gained speed, or in the case of the shoes the strength of the runner's stride. These are only a few of the possibilities for the aesthetic enhancement of consumer goods by the use of a dynamic exteriors. FIG. 27G illustrates how a display could respond to the state of the consumer product. The control mechanism would consist of a sensor 2730, which could detect vibration (in a shoe or ski) or temperature (in a turkey), program logic 2732, which would interpret the sensor output and provide preprogrammed (or reprogrammable) images or image data to display 2734, communications input/output 2738, and display control electronics 2736.

Figure 28A:
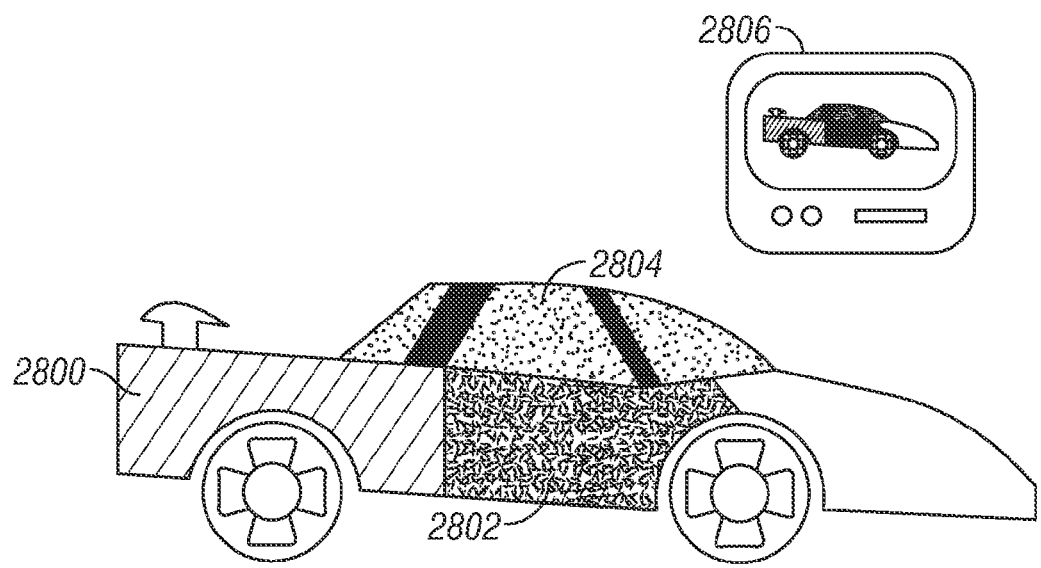
FIGS. 28A and 28B are side views of an IMod display used in an application for automotive decoration and a components diagram.
Figure 28B:
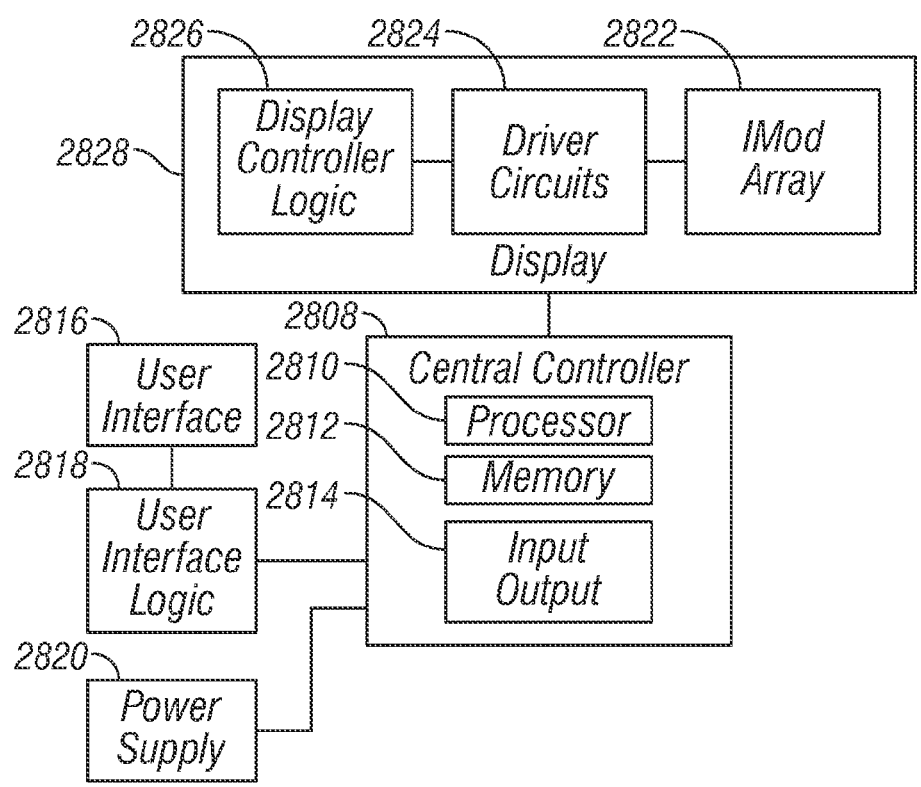

Referring to FIGS. 28A and 28B, even larger interferometric modulator arrays are shown incorporated into the exterior of an automobile. In this case body panels 2800, 2802 as well as windows 2804, could use reflective and transmissive IMod designs respectively. Dynamic control of the exterior appearance of a car would be a very appealing option for the owner, providing the ability for the owner to customize the appearance himself, or to "download" exteriors in a digital fashion. Such a control 2806 could take the form of a small panel integrated into the dashboard which displayed various exteriors under button control. The same techniques could be applied to other highly style oriented goods in the class and functional category, including motorcycles, sailboats, airplanes and more. FIG. 28B shows a components diagram illustrating one way in which this product could be implemented using off-the-shelf components. In general, they comprise a central controller 2808 (including processor 1810, memory 2812, and low level I/O 2814), high level I/O components (user interface 2816, and logic 2818), display 2828 (logic 2826, drivers 2824, IMod array 2822) and power supply 2820. The central controller handles general purpose operational functions, while high level I/O components dictate how information gets in and out of the product.

Figure 29A:
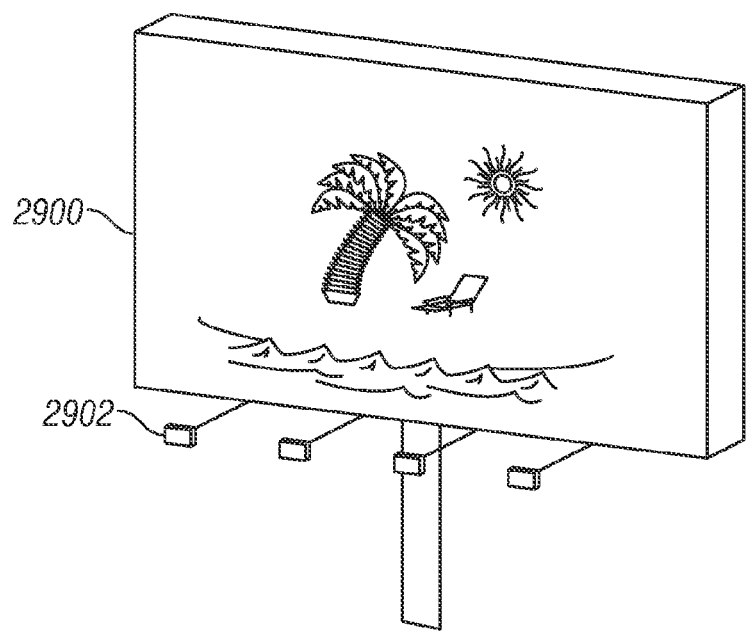
FIGS. 29A, 29B, and 29C are views of an IMod array used as a billboard display and a components diagram.
Figure 29B:
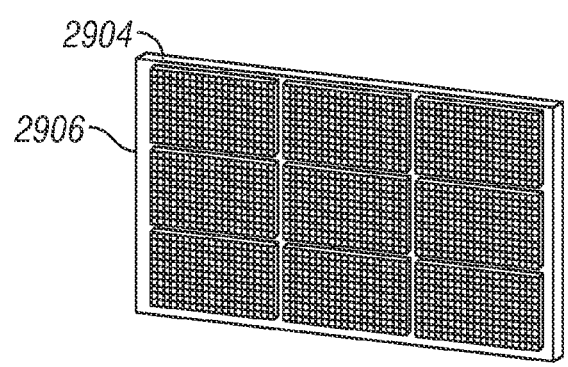
Figure 29C:
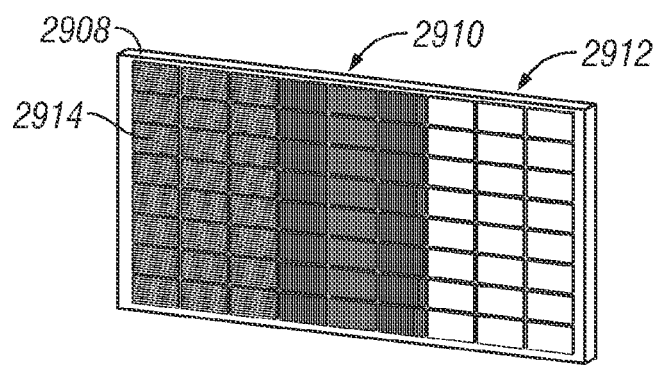
Figure 30A:
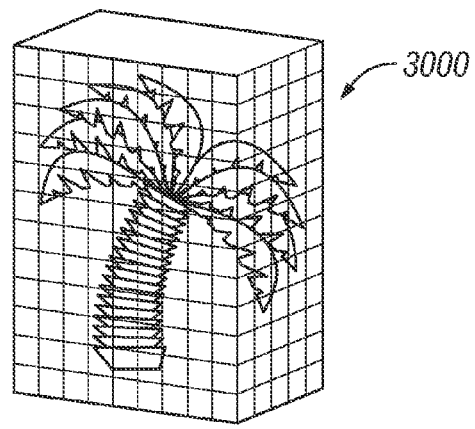
FIGS. 30A and 30B are views of an IMod array used as an architectural exterior and a components diagram.
Figure 30B:
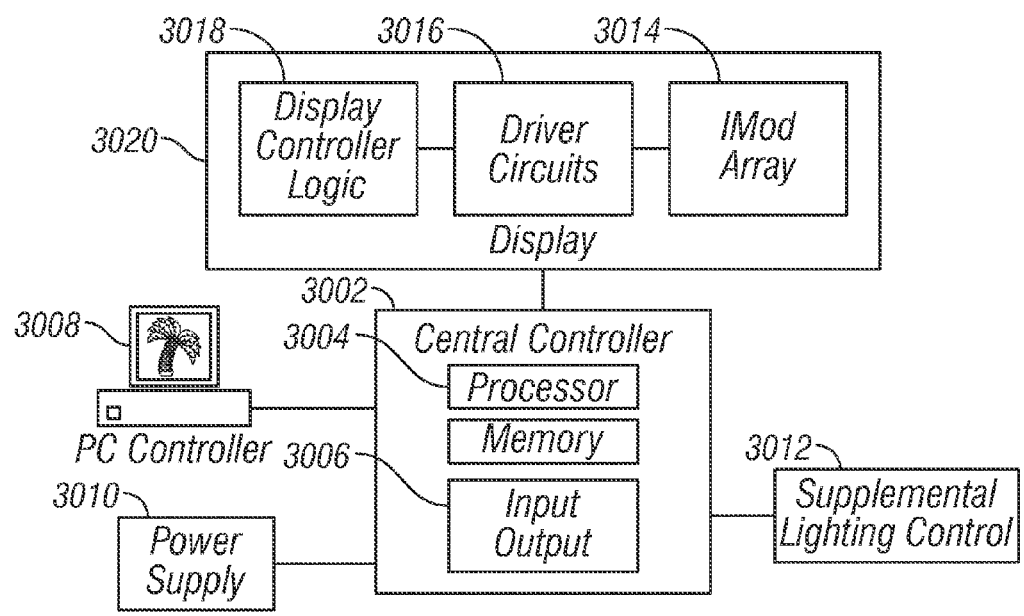

Referring to FIGS. 29A through 29C, billboard-sized arrays 2900 of IMod display segments could be assembled and replace current static displays used for advertising and public service announcements. Display 2900 would include reflective devices to be illuminated by ambient light or a supplemental light source 2902. A large display could be assembled from individual segments 2904 (FIG. 29B) which would support segment pixels 2906. Each segment pixel would include three sets of sub-pixel arrays 2910, 2912, and 2914, which would reside on pixel substrate 2908 (FIG. 29C). The resulting large displays could range from placards on the sides of buses and inside of subways, to billboards, to entire architectural structures such as homes or skyscrapers. In FIG. 30A, skyscraper 3000 is an example of a large building which exploits the aesthetic and cheap manufacture of the IMod array. All of the glass used in the manufacture of such structures is coated with thin films up to 4 or more layers thick to provide energy efficient coatings. Similar coating techniques could be applied to the manufacture of the IMod arrays. FIG. 30B shows a components diagram illustrating one way in which both of these products could be implemented using off-the-shelf components. In this case, they comprise a central controller 3002 (including processor 3004, memory 3006, and low level I/O 3006), high level I/O components (PC based user interface 3008), display 3020 (logic 3018, drivers 3016, IMod array 3014), lighting control 3012, and power supply 3010. The central controller handles general purpose operational functions, high level I/O components dictate how information gets in and out of the product, and the controller components manipulate supplementary lighting and peripheral components.

It should be noted that several alternative display technologies may also be applicable to some of the less rigorous aesthetic applications, in particular, small AMLCDs, LCDs fabricated on active crystalline silicon, field emission displays (FEDs), and possibly plasma based displays. These technologies are deficient due to their price, manufacturing complexity, and non-reflective (emissive) operation. However, certain high-end fashion oriented products (luxury watches, jewelry and clothing) may command a price and provide an environment which could make these viable approaches. Organic emitters could be particularly suited for exterior applications which are not necessarily exposed to environmental extremes and which might be seen in dimly lit situations. They are the only emissive technology which offers the potential for very low-cost and ease of manufacture. The Alq/diamine structures and poly(phenylene vinylene) materials, which were described before, could be patterned and directly addressed on a variety of substrates (plastic clothing inserts for example) to provide dynamic exteriors.

Figure 31A:
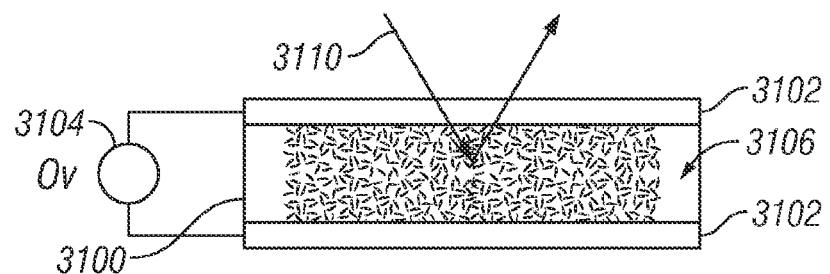
FIGS. 31A and 31B are drawings of a liquid crystal impregnated with an interferometric pigment.
Figure 31B:
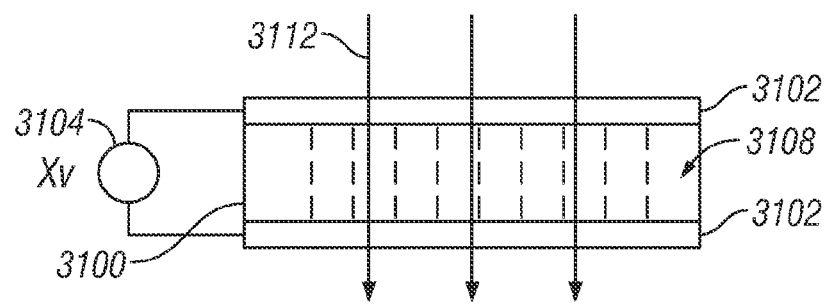

FIG. 31A shows interferometric particles suspended in a liquid crystal medium, 3100, making possible full color liquid crystal displays based on the controlled orientation of the particles within the medium. As shown in FIG. 31B, application of a voltage between electrodes 3102 from source 3104 causes the particles to be driven from their random quiescent orientation 3106 defined by the liquid crystal and the surfaces of the substrate into an orderly orientation 3108. When the particles are randomly oriented, light of a specific color 3110 is reflected. When the particles are ordered, light 3112 passes through.

Figure 32A:
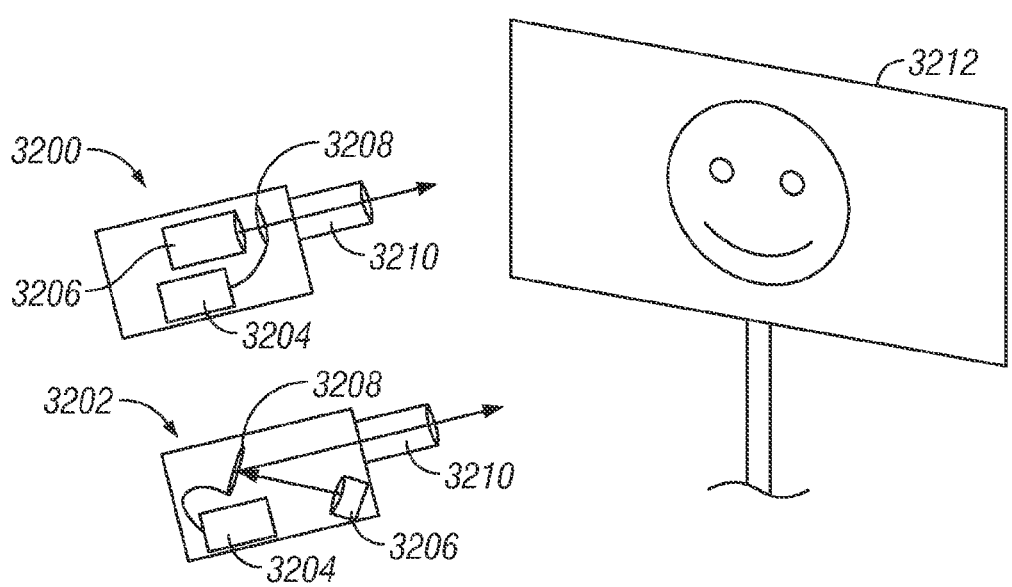
FIGS. 32A and 32B are drawings of an IMod array used in a projection display and a components diagram.
Figure 32B:
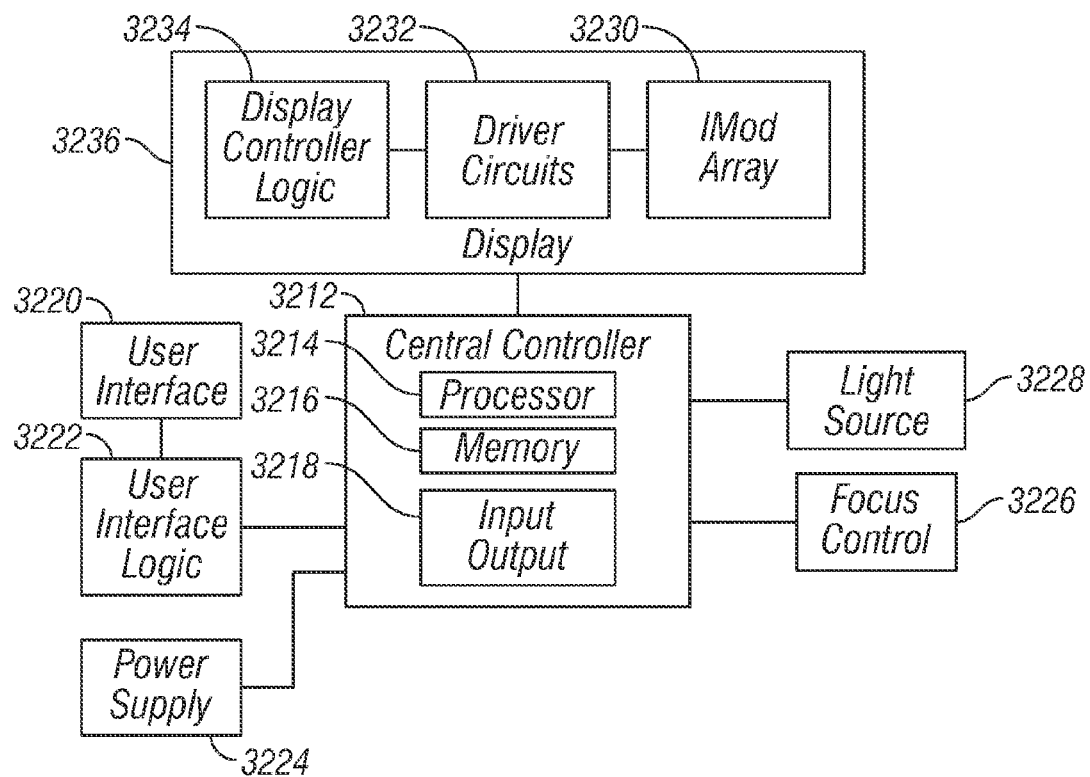

Referring to FIG. 32A, two kinds of projection display units, 3200 and 3202, are shown. Each unit comprises components consisting of light source/optics 3206, electronics 3204, projection optics 3210, and IMod array 3208. While the IMod array in projector 3200 is designed for use in transmission mode, the Mod array in projector 3202 is designed for use in reflection mode. The other components are essentially the same with the exception of the need to modify the optics to accommodate the difference in the nature of the optical path. Screen 3212 shows a representative projected image. FIG. 32B shows a components diagram illustrating one way in which this product could be implemented using off-the-shelf components. In this case, they comprise a central controller 3212 (including processor 3214, memory 3216, and low level I/O 3218), high level I/O components (user interface 3220 and logic 3222), display 3236 (logic 3234, drivers 3232, IMod array 3230) focus/light source control 3226, and power supply 3224. The central controller handles general purpose operational functions, high level I/O components dictate how information gets in and out of the product, and the controller components manipulate peripheral devices.

Figure 33A:
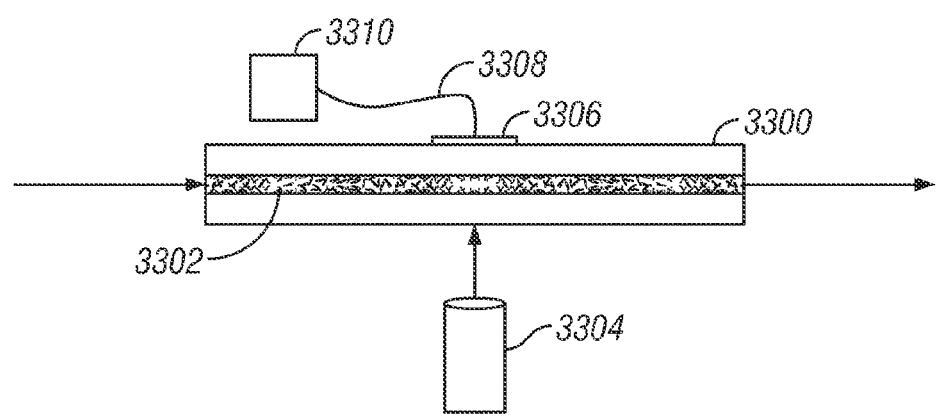

An application in chemical analysis is illustrated in FIG. 33A. Transparent cavity 3300 is fabricated such that gas or liquid medium 3302 may pass through its length. Light source 3304 is positioned to project broad spectrum light through the medium into tunable IMod array 3306. This array could be coupled to a fiber 3308, or reside on a detector array with 3308 acting as data link to electronics 3310. By spectrally analyzing the light which passes through the medium, much can be determined about its composition in a compact space. Such a device could be used to measure the pollutants in an air stream, the components in a liquid, separations in an chromatographic medium, fluorescing compounds in a medium, or other analytes which can be measured using light, depending on the frequency of the light source. FIG. 33B shows a components diagram illustrating one way in which this product could be implemented using off-the-shelf components. In this case, they comprise a central controller 3312 (including processor 3314, memory 3316, and low level I/O 3318), high level I/O components (user interface 3320, and logic 3322), IMod drivers 3330 and IMod 3328, light source 3326, and power supply 3324. The central controller handles general purpose operational functions, high level I/O components dictate how information gets in and out of the product, and the controller components manipulate peripheral devices.

Figure 34C:
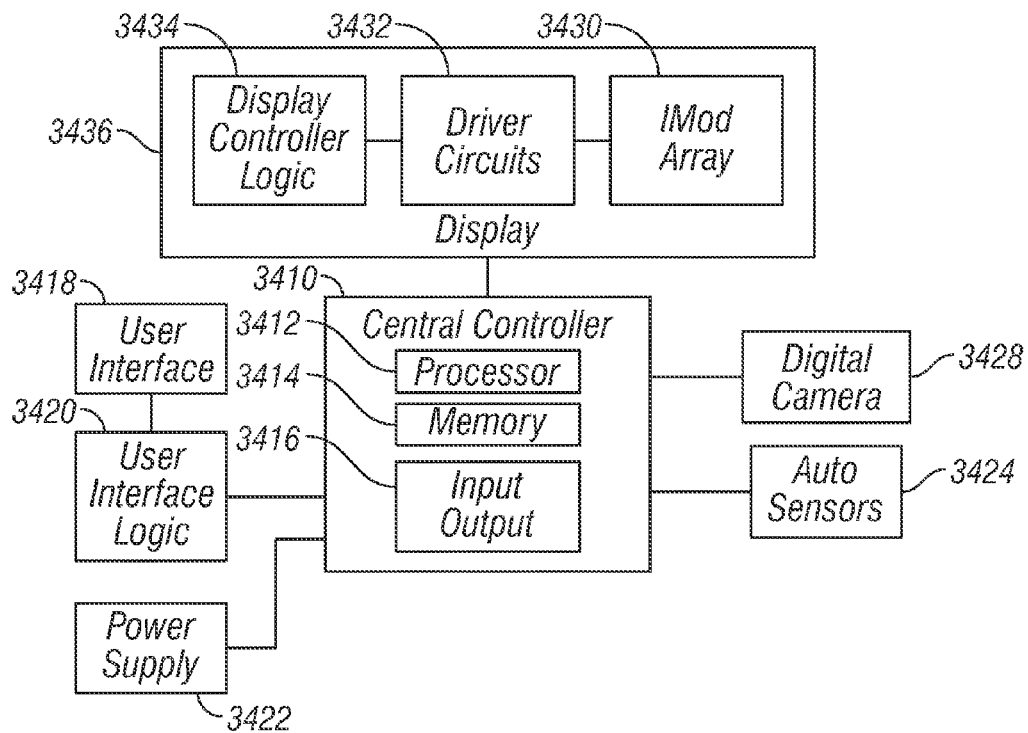

FIG. 34A illustrates an automotive application from a driver's viewpoint. FIG. 34B represents a side view of the windshield and dashboard. A direct view graphical display 3404 portrays a variety of information, for example, an enhanced view of the roadway. An image generated in the windshield via a heads-up display. Such a display is a variation on the previously discussed projection system. In this case, the inside of the windshield acts as a translucent projection screen, and the projector 3406 is mounted in the dashboard. Automotive applications have very stringent requirements for heat, and UV stability, as well as high brightness ambient conditions which would be ideal for an IMod application. FIG. 34C shows a components diagram illustrating one way in which these products could be implemented using off-the-shelf components. In this case, they comprise a central controller 3410 (including processor 3412, memory 3414, and low level I/O 3416), high level I/O components (user interface 3418, digital camera 3428, auto sensors 3424), display 3436 (logic 3434, drivers 3432, IMod array 3430) and power supply 3422. The central controller handles general purpose operational functions, high level I/O components dictate how information gets in and out of the product, and the controller components manipulate peripheral devices.

Figure 35A:
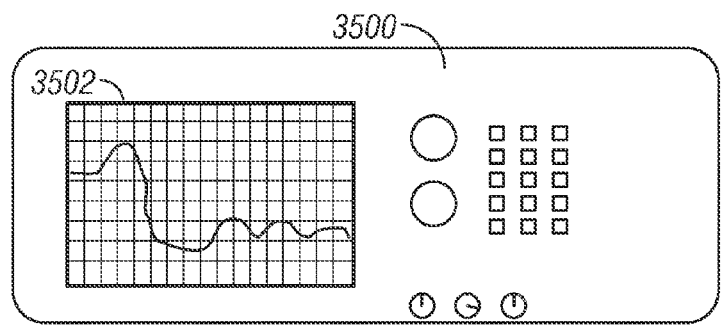
FIGS. 35A and 35B are drawings of an IMod display used in an instrument panel and a components diagram.
Figure 35B:
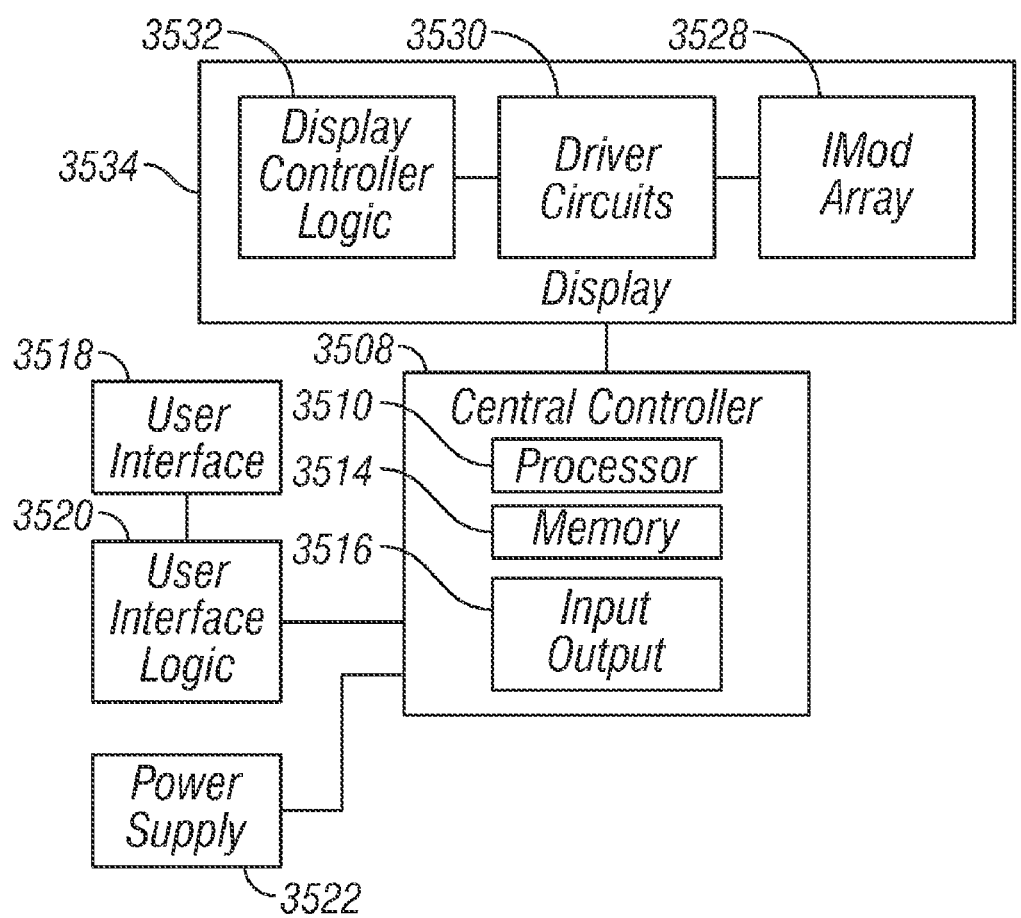

FIG. 35A portrays an application involving an instrument panel, in this case an oscilloscope 3500, though many kinds of special purpose tools could benefit from a graphical display. In this situation, display 3502, is used to show a waveform plot but could also, as described previously, display text, or combinations of graphics and text. Portable low-power tools for field use would benefit greatly from a full-color fast response FPD. FIG. 35B shows a components diagram illustrating one way in which these products could be implemented. All of the components are available off-the-shelf and could be configured by one who is skilled in the art. In this case, they comprise a central controller 3508 (including processor 3510, memory 3514, and low level I/O 3516), high level I/O components (user interface 3518 and logic 3520), display 3534 (logic 3532, drivers 3530, Mod array 3528) and power supply 3522. The central controller handles general purpose operational functions, while high level I/O components dictate how information gets in and out of the product.

Other embodiments are within the scope of the following claims.

What is claimed is:

1. A spatial light modulator comprising:
a light-modulating array including a plurality of light-modulating elements each including an optical cavity defined by first and second reflective surfaces that produce optical interference, said first and second reflective surfaces moveable with respect to each other to alter said optical cavity and enable modulation of said optical interference, said plurality of light-modulating elements having a front side for viewing light modulated by said light-modulating array; and
at least one reflecting element disposed so as to reflect light propagating from a rear side of the plurality of light-modulating elements into at least one of said optical cavities for modulation,
wherein said at least one reflecting element is disposed over the front side of said plurality of light-modulating elements.

2. The spatial light modulator of claim 1, wherein said at least one reflecting element and said plurality of light-modulating elements are disposed over opposite sides of a substrate.

3. The spatial light modulator of claim 1, wherein the at least one reflecting element includes a mirror.

4. The spatial light modulator of claim 1, further comprising a light source disposed rearward of the light modulating array.

5. The spatial light modulator of claim 4,
wherein the plurality of light modulating elements are spaced apart by gaps, and
wherein light from the light source is transmitted forward through the gaps towards a plurality of said reflecting elements.

6. The spatial light modulator of claim 5, wherein the reflective elements in said plurality of reflecting elements are disposed over the gaps thereby aligning the reflecting elements with the gaps.

7. A display including the spatial light modulator of claim 1, wherein the display includes a processor configured to communicate with the spatial light modulator and configured to process image data.

8. The display of claim 7 further including a driver circuit configured to send at least one signal to the spatial light modulator.

9. The display of claim 8 further including a controller configured to send at least a portion of the image data to the driver circuit.

10. A spatial light modulator comprising:
a plurality of means for interferometrically modulating light, each interferometric light-modulating means including means for producing optical interference, the plurality of interferometric light-modulating means having a front side for viewing light modulated by the plurality of interferometric light-modulating means;
at least one means for reflecting light disposed so as to reflect light propagating from a rear side of the plurality of interferometric light-modulating means into at least one of the optical interference-producing means;
wherein the at least one reflecting means is disposed over the front side of the plurality of interferometric light-modulating means.

11. The spatial light modulator of claim 10, wherein the interferometric light-modulating means includes a light-modulating element, and the optical interference-producing means includes an optical cavity defined by first and second reflective surfaces that produce optical interference, the first and second reflective surfaces moveable with respect to each other to alter the optical cavity and enable modulation of the optical interference.

12. The spatial light modulator of claim 10, wherein the at least one reflecting means and the light-modulating means are disposed over opposite sides of a substrate.

13. The spatial light modulator of claim 10, wherein the at least one reflecting means includes a mirror.

14. The spatial light modulator of claim 10, further comprising a means for emitting light disposed rearward of the plurality of interferometric light-modulating means.

15. The spatial light modulator of claim 14,
wherein the plurality of interferometric light-modulating means are spaced apart by at least one means for passing light, and
wherein light from the light-emitting means is transmitted forward through the at least one light-passing means toward the at least one reflecting means.

16. The spatial light modulator of claim 15, wherein the at least one reflecting means is disposed over the at least one light-passing means, thereby aligning the reflecting means with the light-passing means.

17. A method of manufacturing a spatial light modulator, the method comprising:
disposing a plurality of light-modulating elements over a substrate so as to form a light-modulating array, the light-modulating elements each including an optical cavity defined by first and second reflective surfaces that produce optical interference, the first and second reflective surfaces movable with respect to each other to alter the optical cavity and enable modulation of the optical interference, the plurality of light-modulating elements having a front side for viewing light modulated by the light-modulating array; and
disposing at least one reflective element over the front side of the plurality of light-modulating elements so as to reflect light propagating from a rear side of the plurality of light-modulating elements into at least one of the optical cavities for modulation.

18. The method of claim 17, wherein disposing the at least one reflecting element includes forming a mirror.

19. The method of claim 17, further comprising disposing a light source rearward of the light-modulating array.

20. The method of claim 19, wherein disposing the plurality of light-modulating elements includes spacing the light-modulating elements by gaps.

21. The method of claim 20, wherein disposing the at least one reflective element includes aligning the at least one reflective element with at least one gap.

* * * * *